US012361843B2

(12) United States Patent
Akaba et al.

(10) Patent No.: US 12,361,843 B2
(45) Date of Patent: Jul. 15, 2025

(54) SHELF TAG ATTACHMENT APPARATUS

(71) Applicants: NEC Corporation, Tokyo (JP); NEC Platforms, Ltd., Kawasaki (JP)

(72) Inventors: Kunihiro Akaba, Kanagawa (JP); Hiromitsu Nakano, Kanagawa (JP); Akihiko Onita, Tokyo (JP); Shunsuke Tsuda, Tokyo (JP); Hiroki Sugegaya, Tokyo (JP)

(73) Assignees: NEC CORPORATION, Tokyo (JP); NEC Platforms, Ltd., Kanagawa (JP)

( * ) Notice: Subject to any disclaimer, the term of this patent is extended or adjusted under 35 U.S.C. 154(b) by 89 days.

(21) Appl. No.: 18/017,630

(22) PCT Filed: Jul. 29, 2021

(86) PCT No.: PCT/JP2021/028124
§ 371 (c)(1),
(2) Date: Jan. 23, 2023

(87) PCT Pub. No.: WO2022/025192
PCT Pub. Date: Feb. 3, 2022

(65) Prior Publication Data
US 2024/0013683 A1 Jan. 11, 2024

(30) Foreign Application Priority Data
Jul. 31, 2020 (JP) ................................ 2020-130342

(51) Int. Cl.
*G09F 7/08* (2006.01)
*G09F 7/18* (2006.01)

(52) U.S. Cl.
CPC . *G09F 7/08* (2013.01); *G09F 7/18* (2013.01)

(58) Field of Classification Search
CPC ... G09F 7/08; G09F 7/18; G09F 3/204; G09F 7/10; G09F 3/208; G09F 3/20; G09F 3/08; G09F 3/00
See application file for complete search history.

(56) References Cited

U.S. PATENT DOCUMENTS 5,611,512 A * 3/1997 Cholet .................... G09F 3/208 248/222.12
5,791,080 A * 8/1998 Hamano ................ G09F 3/208 40/642.02
(Continued)

FOREIGN PATENT DOCUMENTS

JP S56-150986 U 11/1981
JP H04-028680 U 3/1992
(Continued)

OTHER PUBLICATIONS

International Search Report for PCT Application No. PCT/JP2021/028124, mailed on Oct. 5, 2021.

*Primary Examiner* — Cassandra Davis

(57) ABSTRACT

A shelf tag attachment apparatus (100) includes an electronic shelf tag (101), and a shelf tag holding portion (103) for holding the electronic shelf tag (101). The electronic shelf tag (101) includes, on each of an upper end and a lower end, a groove portion (105) extending in a left-right direction, and the shelf tag holding portion (103) includes a protrusion portion (115) that projects downwards and upwards, and that fits into each of the upper groove portion (105) and a lower groove portion (105). At least one combination of a combination of the upper groove portion (105) and the protrusion portion (115) that fits into the groove portion (105), and a combination of the lower groove portion (105) and the protrusion portion (115) that fits into the groove portion (105) is discretely provided.

5 Claims, 20 Drawing Sheets

(56) References Cited

U.S. PATENT DOCUMENTS

| | | | | |
|---|---|---|---|---|
| 6,035,569 | A * | 3/2000 | Nagel | A47F 5/0068 40/658 |
| 6,126,125 | A * | 10/2000 | Dalton | G09F 3/204 248/205.2 |
| 6,189,248 | B1 * | 2/2001 | Nagel | G09F 3/204 40/658 |
| 10,706,749 | B1 * | 7/2020 | White | G09F 3/204 |
| 2004/0178308 | A1 * | 9/2004 | Bacnik | G09F 3/204 248/223.41 |
| 2004/0262470 | A1 * | 12/2004 | Lowry | G03B 21/00 248/205.1 |
| 2006/0143962 | A1 * | 7/2006 | Fast | G09F 3/0295 40/642.02 |
| 2014/0218618 | A1 | 8/2014 | Sasaoka et al. | |
| 2021/0090471 | A1 * | 3/2021 | Kim | G09F 3/208 |
| 2024/0096241 | A1 * | 3/2024 | Sugegaya | H05K 5/0204 |

FOREIGN PATENT DOCUMENTS

| | | | | |
|---|---|---|---|---|
| JP | H06-059631 | A | 3/1994 | |
| JP | 2008-151984 | A | 7/2008 | |
| JP | 3148719 | U | 2/2009 | |
| JP | 2014-153438 | A | 8/2014 | |
| WO | 2010/125692 | A1 | 11/2010 | |
| WO | WO-2017141199 | A1 * | 8/2017 | G09F 3/204 |

* cited by examiner

SHELF TAG ATTACHMENT APPARATUS

This application is a National Stage Entry of PCT/JP2021/028124 filed on Jul. 29, 2021, which claims priority from Japanese Patent Application 2020-130342 filed on Jul. 31, 2020, the contents of all of which are incorporated herein by reference, in their entirety.

TECHNICAL FIELD

The present invention relates to a shelf tag attachment apparatus.

BACKGROUND ART

As a shelf tag attachment apparatus for attaching, to a product shelf, a shelf tag for displaying a product price or the like, for example, a holder for display described in PTL 1 is suggested.

The holder described in PTL 1 is constituted of a display body attachment member, and a slide member that fits into a rear surface of the display body attachment member and slides in an up-down direction such that a fixing position is determined. Further, the holder described in PTL 1 includes, as a guide means for guiding sliding, in the up-down direction, of the slide member relative to the display body attachment member, an engagement groove of the display body attachment member and a flange portion of the slide member.

The slide member is attached along a plate spring member having, at a tip, a protrusion projecting in a frontward direction, the display body attachment member is attached along a depressed portion in which an upper wall surface and a lower wall surface are upwardly tilted from a bottom side toward an upper side, and positioning lock is performed by engagement of the protrusion of the plate spring member and the depressed portion.

RELATED DOCUMENT

Patent Document

[PTL 1] Japanese Utility Model Registration Publication No. 3148719

SUMMARY OF THE INVENTION

Technical Problem

In a holder described in PTL 1, an engagement groove is open on only an upper side, and, therefore, a flange portion of a slide member needs to be inserted into the engagement groove from an upper side. Thus, when the slide member is attached to a display body attachment member, at least a work space being equal to or more than a length of the flange portion is needed upwards from an upper end of the engagement groove. It is preferable that a shelf tag can be attached in a smaller work space.

The present invention has been made in view of a situation described above, and one of objects thereof is to enable attaching a shelf tag in a small work space.

Solution to Problem

In order to achieve the object described above, a shelf tag attachment apparatus according to the present invention includes:

- a shelf tag; and
- a shelf tag holding portion for holding the shelf tag, wherein
- the shelf tag includes, on each of an upper end and a lower end, a groove portion extending in a lateral direction,
- the shelf tag holding portion includes a protrusion portion that projects downwards and upwards, and that fits into each of the upper groove portion and the lower groove portion, and
- at least one combination of a combination of the upper groove portion and a protrusion portion that fits into the groove portion, and a combination of the lower groove portion and a protrusion portion that fits into the groove portion is discretely provided.

Advantageous Effects of Invention

The present invention enables attaching a shelf tag in a small work space.

DESCRIPTION OF EMBODIMENTS

Hereinafter, one example embodiment of the present invention is described by use of the drawings. Note that, in all of the drawings, a similar component is assigned with a similar reference sign, and description thereof is omitted, as appropriate.

«Configuration of Shelf Tag Attachment Apparatus 100»

Figure 1:
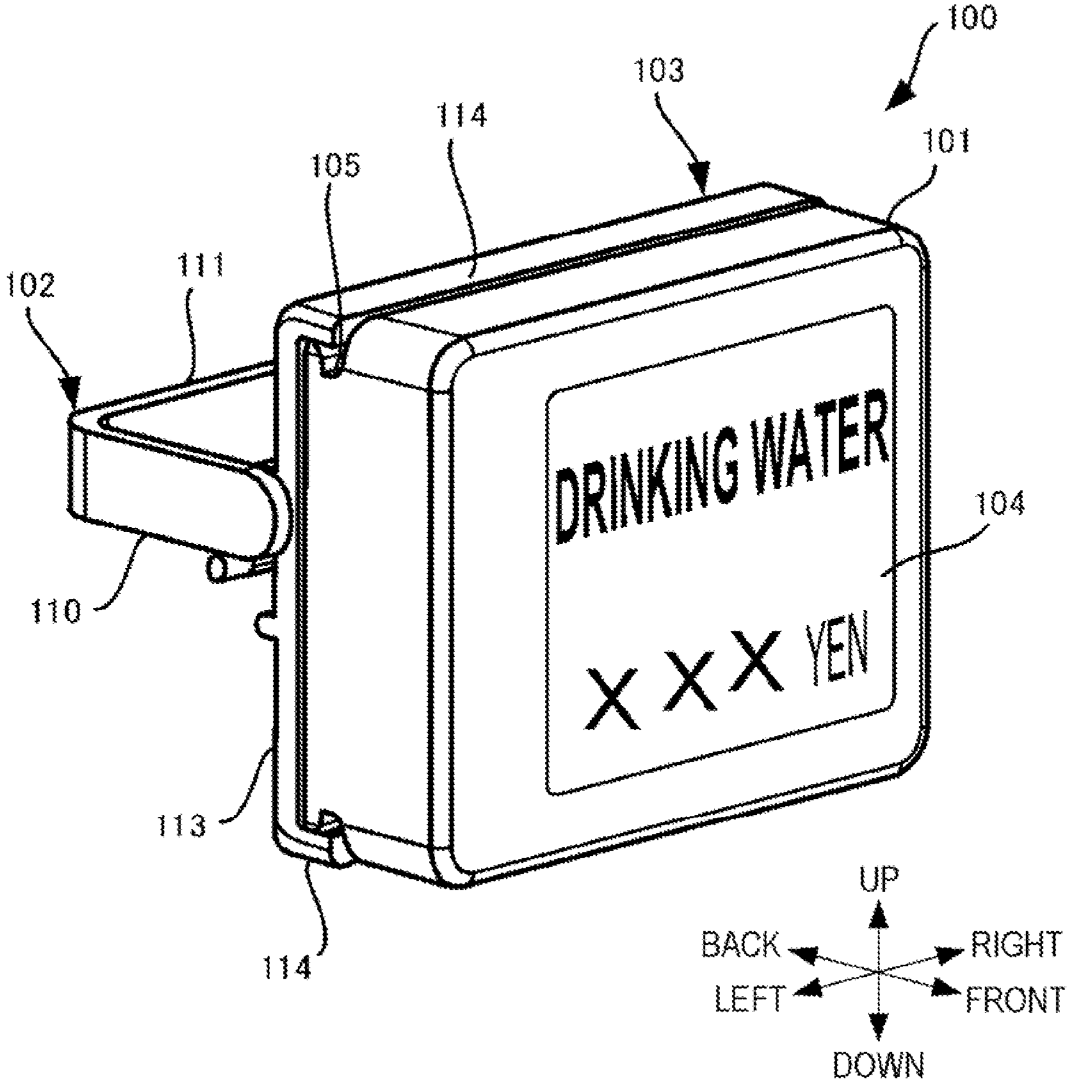
FIG. 1 is a perspective view of a shelf tag attachment apparatus according to one example embodiment of the present invention.

As illustrated in a perspective view in FIG. 1, a shelf tag attachment apparatus 100 according to one example embodiment of the present invention is an apparatus for attaching, to a product shelf, an electronic shelf tag 101 for displaying a product price or the like, and includes the electronic shelf tag 101, a support member 102, and a shelf tag holding portion 103.

The electronic shelf tag 101 is a shelf tag including, in a display surface, a display portion 104 configured by, for example, a liquid crystal display panel. Typically, a product name, a price, an advertisement, and the like are displayed on the display portion 104. Note that, the electronic shelf tag 101 is one example of a shelf tag, and the shelf tag may be made of paper, paper held onto a resin plate, made of resin, or the like.

In the present example embodiment, it is assumed that, when an orientation of a character, a sign, or the like displayed on the display portion 104 is correctly faced in an up-down direction, and the display portion 104 (i.e., the display surface) is disposed parallel to a vertical direction, a direction in which the display portion 104 faces is a frontward direction, and a direction opposite thereto is a backward direction. Moreover, the up-down direction in this case conforms to a vertically upward side and a vertically downward side opposite thereto. It is assumed that a left-right direction is defined by being viewed from front, and is equivalent to a lateral direction. Note that, the directions are used in order to describe the present invention, and are not intended to limit the present invention.

Figure 2:
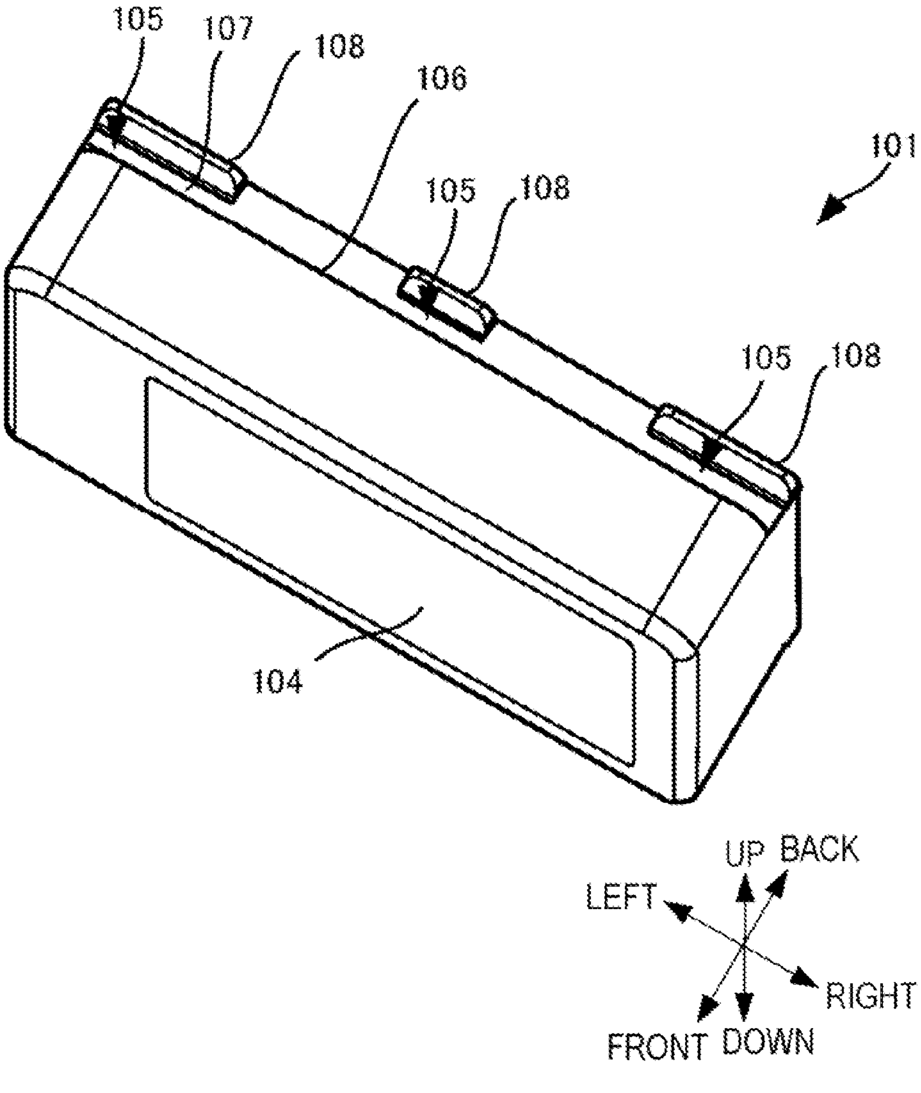
FIG. 2 is a perspective view of an electronic shelf tag according to one example embodiment.

As illustrated in a perspective view in FIG. 2, the electronic shelf tag 101 substantially forms a rectangular parallelepiped, and includes, at an upper end, a groove portion 105 extending in the lateral direction. The upper end of the electronic shelf tag 101 according to the present example embodiment is in a planar shape, and the groove portion 105 is provided in a vicinity of a back end of the upper end of the electronic shelf tag 101.

Specifically, the groove portion 105 is constituted of a front step portion 106, an upwardly facing upper surface portion 107, and a back wall portion 108 provided with a clearance at a back end of the upper surface portion 107. The back wall portion 108 is provided with a clearance (gap), and, thereby, the groove portion 105 is discretely provided with a clearance in the lateral direction. Thus, the groove portion 105 includes a backwardly open portion.

In the present example embodiment, the three back wall portions 108 arranged in the lateral direction are provided, a clearance is provided between the middle back wall portion 108 and each of the left and right back wall portions 108, and, thereby, the groove portion 105 is opened backwards at two places.

Although the groove portion 105 (the upper groove portion 105) provided at the upper end of the electronic shelf tag 101 has been described with reference to FIG. 2 herein, the groove portion 105 similar to that at the upper end is provided at a lower end of the electronic shelf tag 101 as well.

In other words, the groove portion 105 (the lower groove portion 105) provided at the lower end of the electronic shelf tag 101 is constituted of a front step portion, a downwardly facing lower surface portion, and a back wall portion provided with a clearance at a back end of the lower surface portion. In the lower groove portion 105 as well, the three back wall portions 108 arranged in the lateral direction are provided with a clearance. Thereby, the lower groove portion 105 is also discretely provided with a clearance in the lateral direction, similarly to the upper groove portion 105.

In the present example embodiment, a position, in the left-right direction, of a backwardly open region is the same in the upper and lower groove portions 105.

Figure 3:
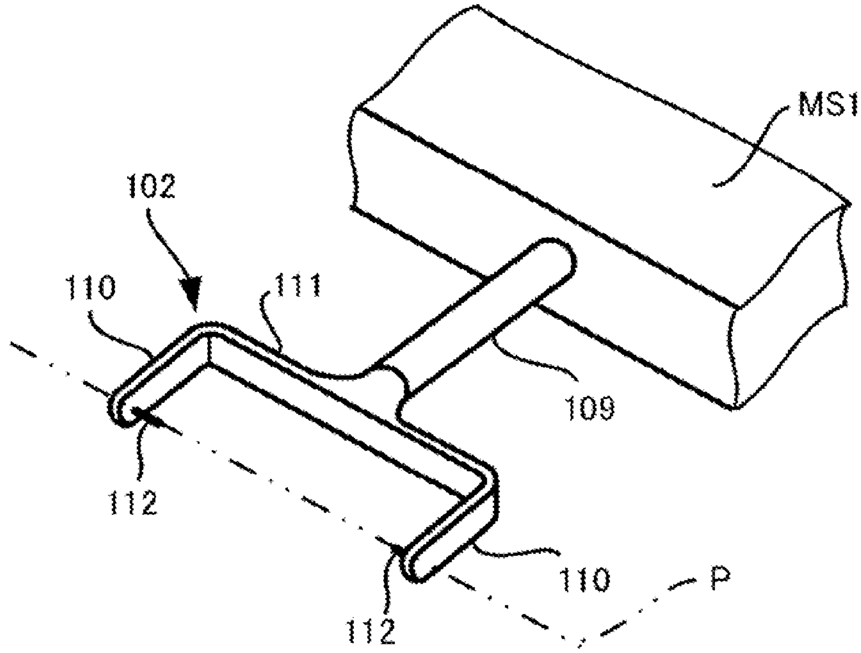
FIG. 3 is a view illustrating one example of a state where a support member is attached to a first product shelf according to one example embodiment.

The support member 102 is a member that supports the shelf tag holding portion 103 to which the electronic shelf tag 101 is attached rotatably about a rotation axis P extending in the lateral direction of the electronic shelf tag 101, and is attached to a first product shelf MS1 as one example is illustrated in FIG. 3.

As illustrated in FIG. 3, the support member 102 is attached to a tip of a rod-shaped body 109 projecting frontwards from the first product shelf MS1. The support member 102 and the rod-shaped body 109 are made of resin, metal, or the like. Note that, the support member 102 and the rod-shaped body 109 may be individually formed of differing materials or the same material, but may be integrally formed.

The support member 102 includes left and right arm portions 110 provided in pairs, and a coupling and fixing portion 111 for coupling the arm portions 110 and fixing the arm portions 110 to the rod-shaped body 109.

The left and right arm portions 110 are flat-plate-shaped portion oppositely disposed with a clearance in the left-right direction, and are elongated in a front-back direction. A tip of each of the arm portions 110 is substantially in a semi-circular shape, when viewed from the lateral direction.

Each of the left and right arm portions 110 includes a shaft portion 112 as a second fit portion extending inwards in a vicinity of a tip of an inner surface. Herein, the inner surface is a surface facing an inward side. Moreover, the inward side is a right side in the left arm portion 110, and is a left side in the right arm portion 110.

In the present example embodiment, the shaft portion 112 is provided through a center of a semicircle formed by an outer shape of a tip when viewed from the lateral direction.

The coupling and fixing portion 111 is a flat-plate-shaped portion being parallel to the up-down direction and being elongated in the left-right direction, and a tip of the rod-shaped body 109 is fixed to substantially a center in the left-right direction. A back end of the arm portion 110 is connected to each of left and right ends of the coupling and fixing portion 111.

Figure 4:
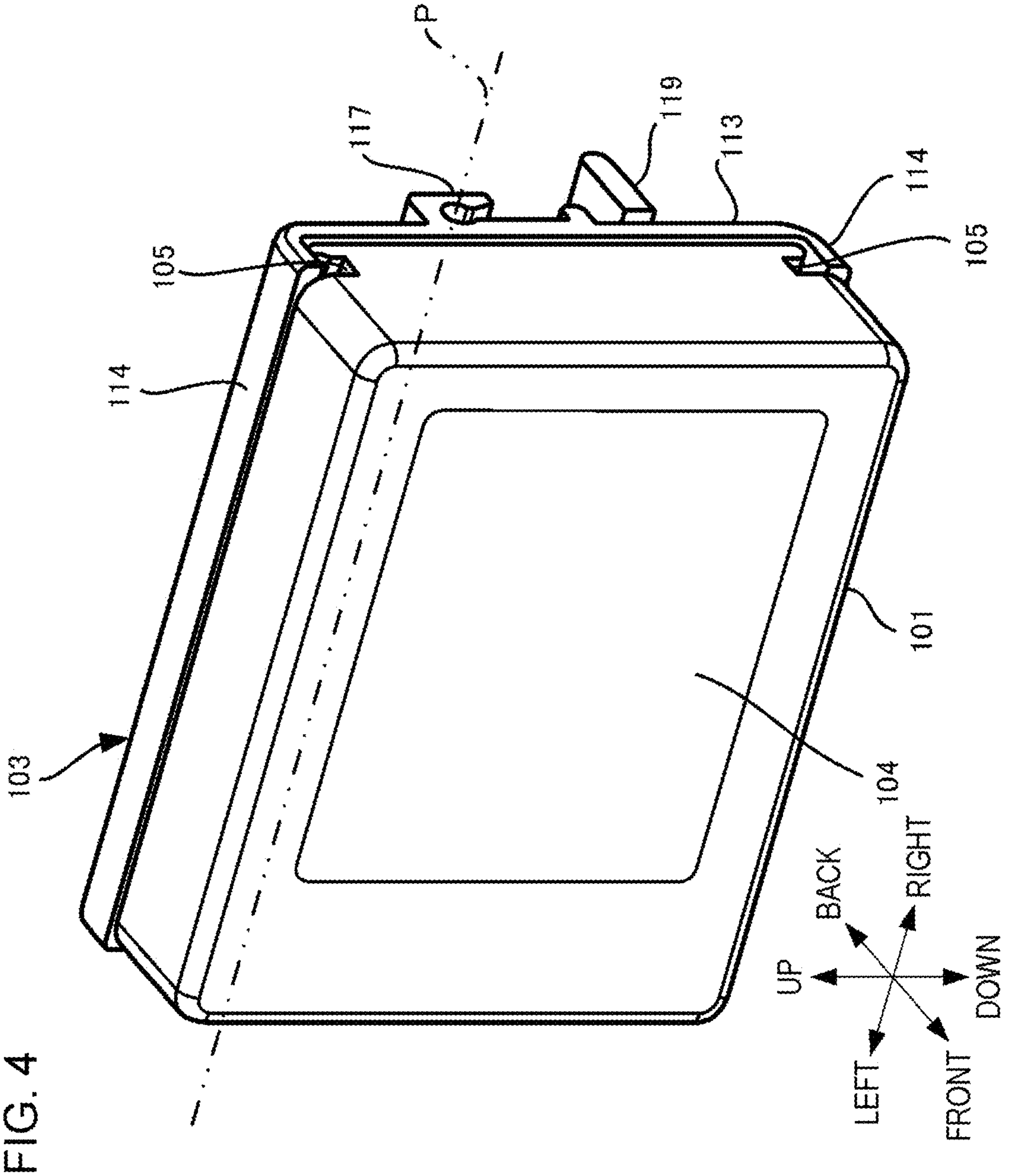
FIG. 4 is a perspective view viewing, from front and diagonally upper right, a shelf tag holding portion to which the electronic shelf tag is attached according to one example embodiment.
Figure 5:
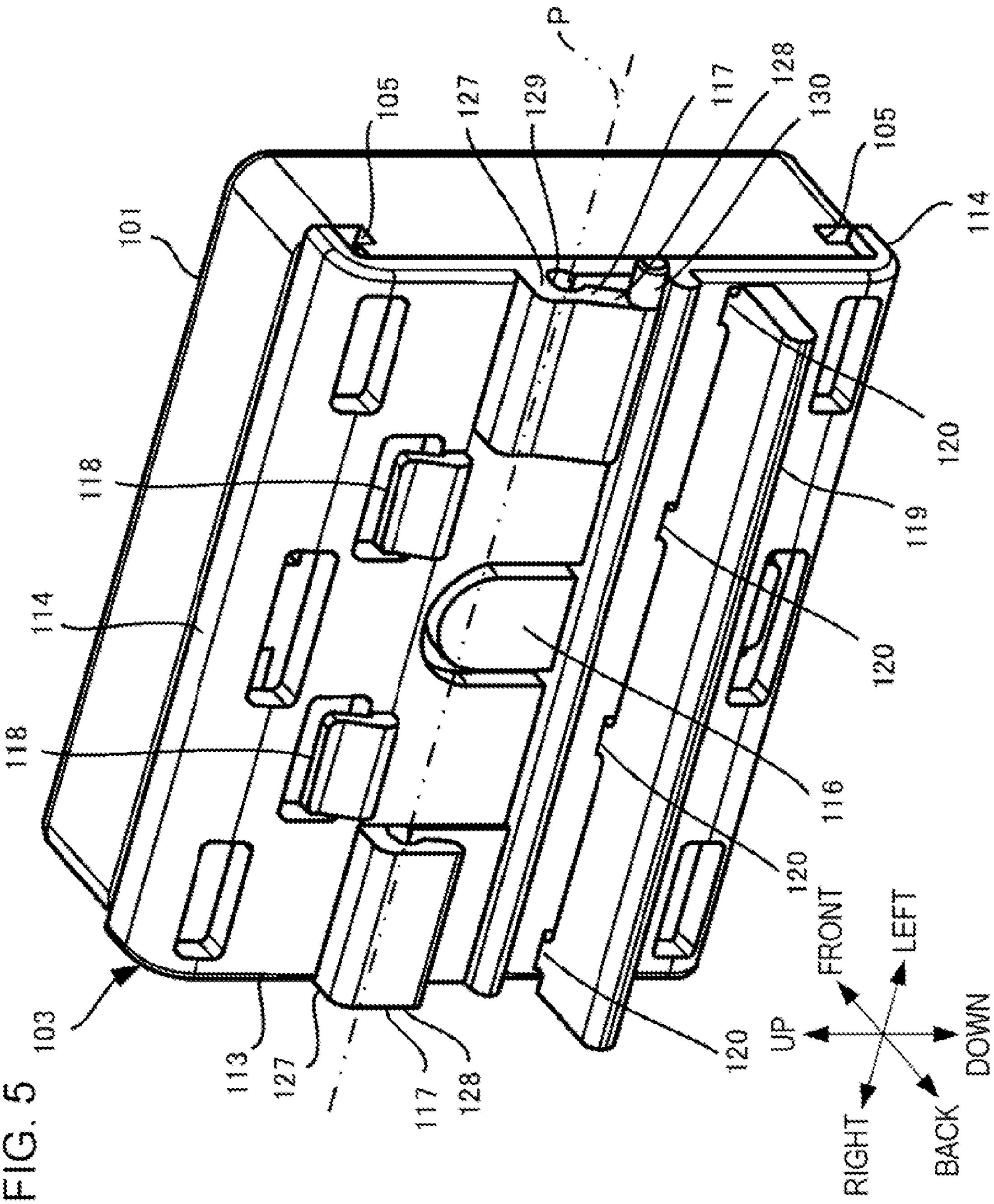
FIG. 5 is a perspective view viewing, from back and diagonally upper right, the shelf tag holding portion to which the electronic shelf tag is attached according to one example embodiment.
Figure 6:
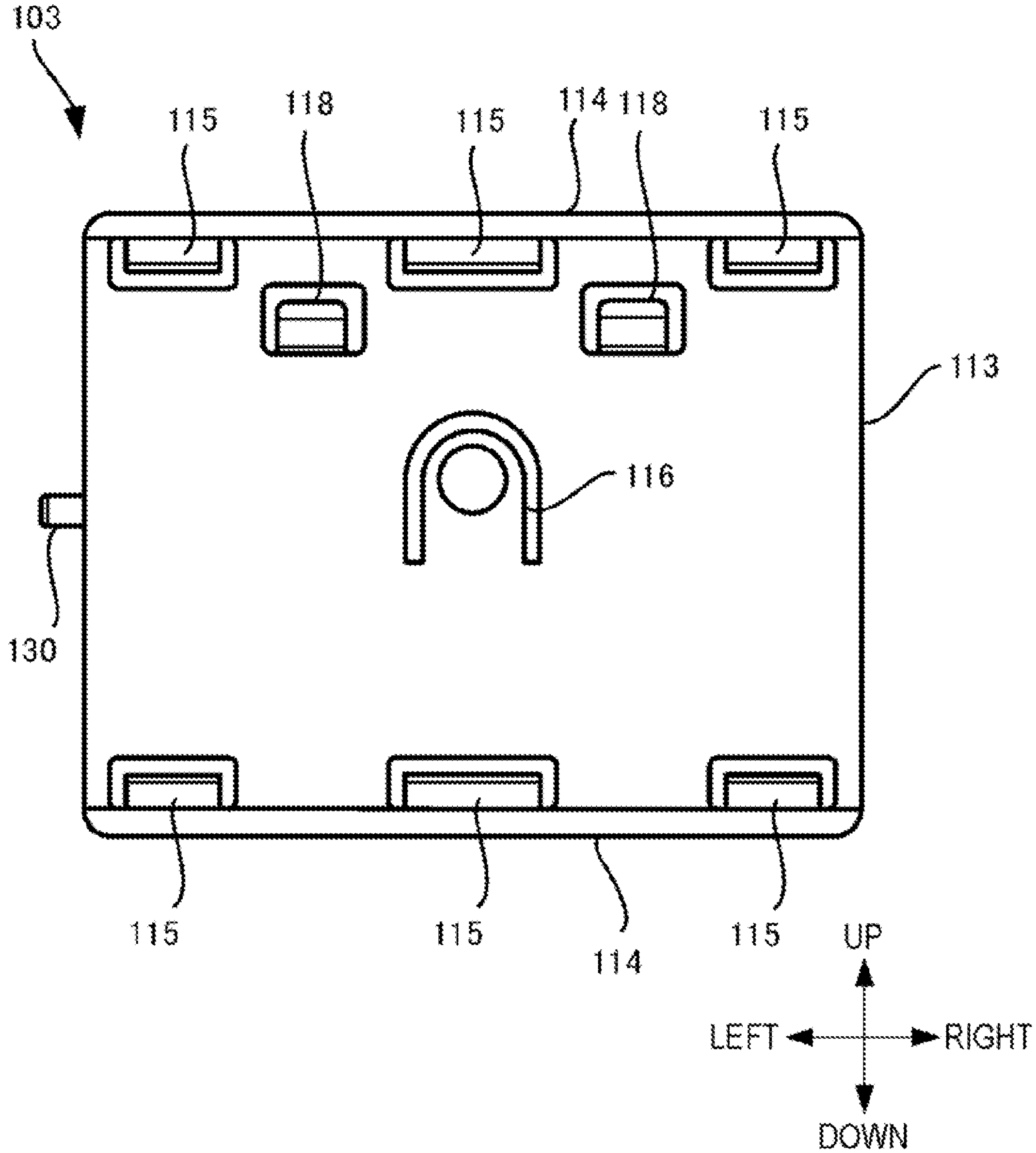
FIG. 6 is a front view of the shelf tag holding portion according to one example embodiment.
Figure 7:
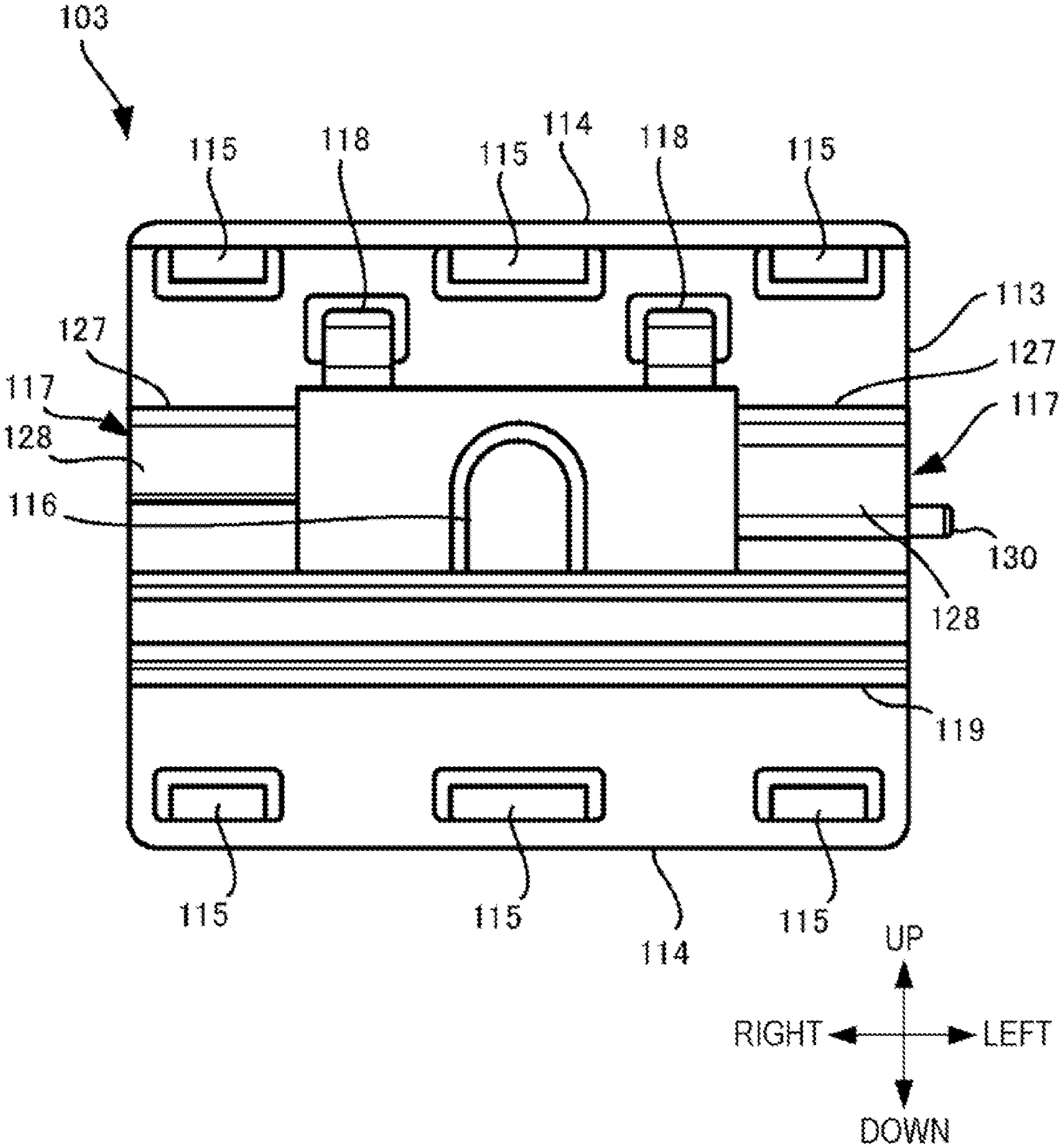
FIG. 7 is a rear view of the shelf tag holding portion according to one example embodiment.
Figure 8:
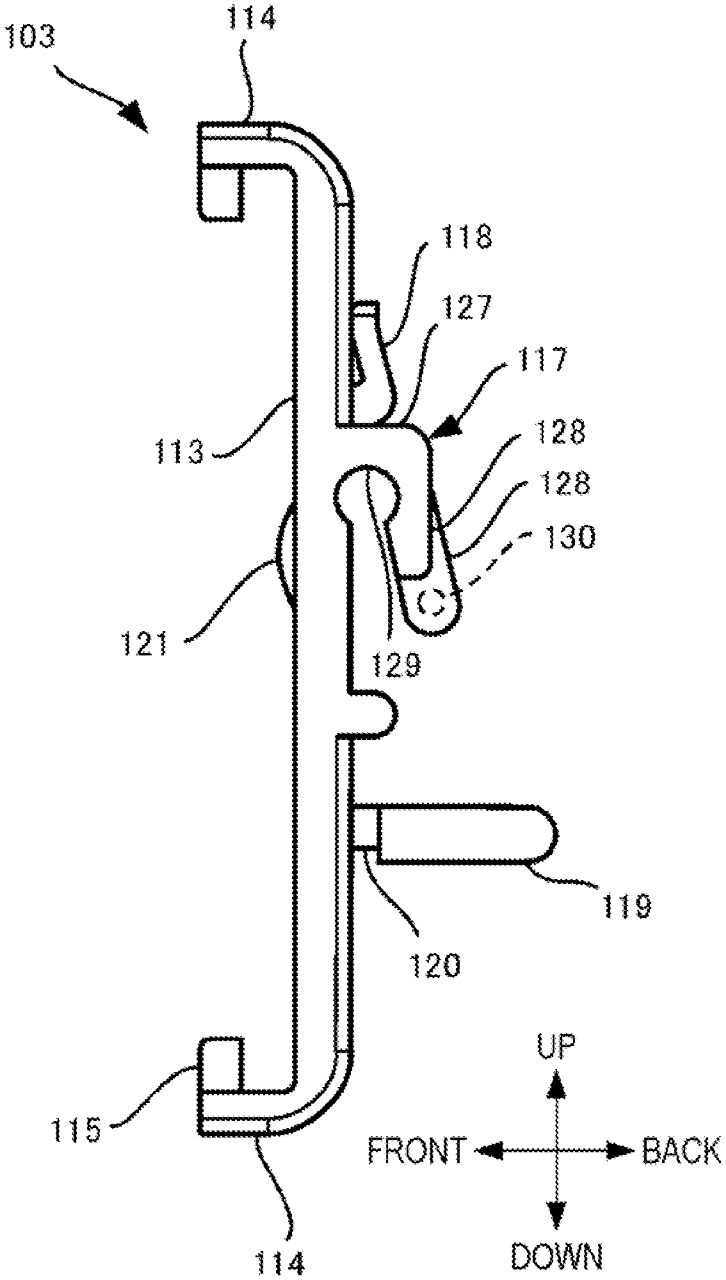
FIG. 8 is a right side view of the shelf tag holding portion according to one example embodiment.
Figure 9:
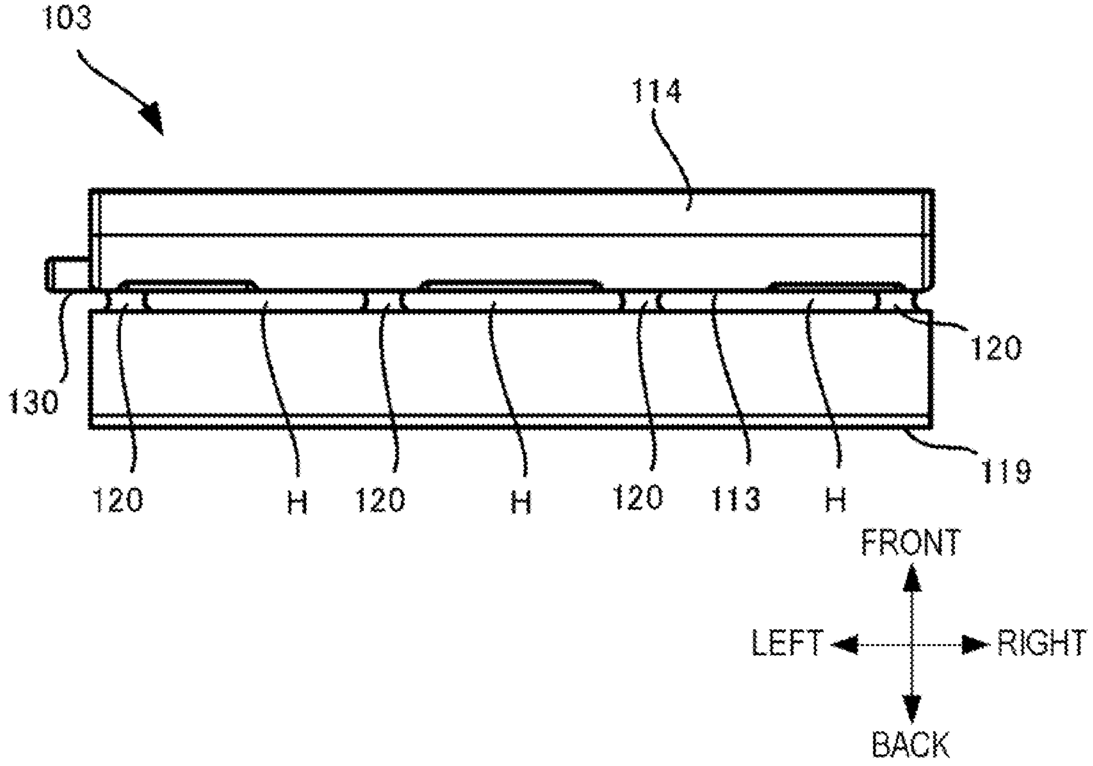
FIG. 9 is a bottom view of the shelf tag holding portion according to one example embodiment.

As illustrated in perspective views in FIGS. 4 and 5, the shelf tag holding portion 103 is a portion for holding the electronic shelf tag 101, and is made of, for example, resin. As illustrated in a front view in FIG. 6, a rear view in FIG. 7, a right side view in FIG. 8, and a bottom view in FIG. 9, the shelf tag holding portion 103 includes a shelf tag attachment portion 113, upper and lower flange portions 114, three protrusion portions 115 on each of upper and lower sides, a spring portion 116, left and right clip portions 117, left and right plug portions 118, a holding plate portion 119, and a holding plate connection portion 120.

The shelf tag attachment portion 113 is a substantially rectangular flat-plate-shaped portion having thickness in the front-back direction. In the present example embodiment, an upper end and a lower end of the shelf tag attachment portion 113 extend in the left-right direction, and a left end and a right end extend in the up-down direction.

The flange portion 114 projects frontwards from each of the upper end and lower end of the shelf tag attachment portion 113, and continues in the lateral direction.

The upper protrusion portion 115 projects downwards, and the lower protrusion portion 115 projects upwards. Thereby, the upper protrusion portion 115 fits into the upper groove portion 105, the lower protrusion portion 115 fits into the lower groove portion 105, and the electronic shelf tag 101 is held.

Specifically, the upper protrusion portion 115 projects downwards from the upper flange portion 114, and is provided in such a way as to be discretely arranged in the left-right direction. In the present example embodiment, three pieces are provided in such a way as to be arranged with clearances (gaps) on left and right sides.

The lower protrusion portion 115 projects upwards from the lower flange portion 114, and is provided in such a way as to be discretely arranged in the left-right direction. In the present example embodiment, three pieces are provided in such a way as to be arranged with clearances in the left-right direction.

In the present example embodiment, the protrusion portion 115 is provided in a vicinity of a front end of the flange portion 114, and, thereby, a groove is formed between the shelf tag attachment portion 113 and the protrusion portion 115. Then, since the upper protrusion portion 115 and the lower protrusion portion 115 are arranged with a clearance in the left-right direction as described above, the groove between the shelf tag attachment portion 113 and the protrusion portion 115 opens frontwards through the clearance.

A clearance provided for the upper protrusion portion 115 and a clearance provided for the lower protrusion portion 115 are at the same position in the left-right direction. In other words, positions, in the left-right direction, of frontwardly open regions are the same in upper and lower grooves.

The spring portion 116 includes a press protrusion 121 being a cantilever-beam-shaped portion provided substantially in a center of the shelf tag attachment portion 113 when viewed from front, and projecting frontwards in a vicinity of a tip. When the electronic shelf tag 101 is attached, the spring portion 116 has the press protrusion 121 pressed by a rear surface of the electronic shelf tag 101, and pushes the electronic shelf tag 101 frontwards by elastic force.

The clip portion 117 is provided on a rear surface of the shelf tag attachment portion 113, and forms a cut being open on a lower side for sandwiching a plate provided in a second product shelf MS2 as a shelf.

Figure 10:
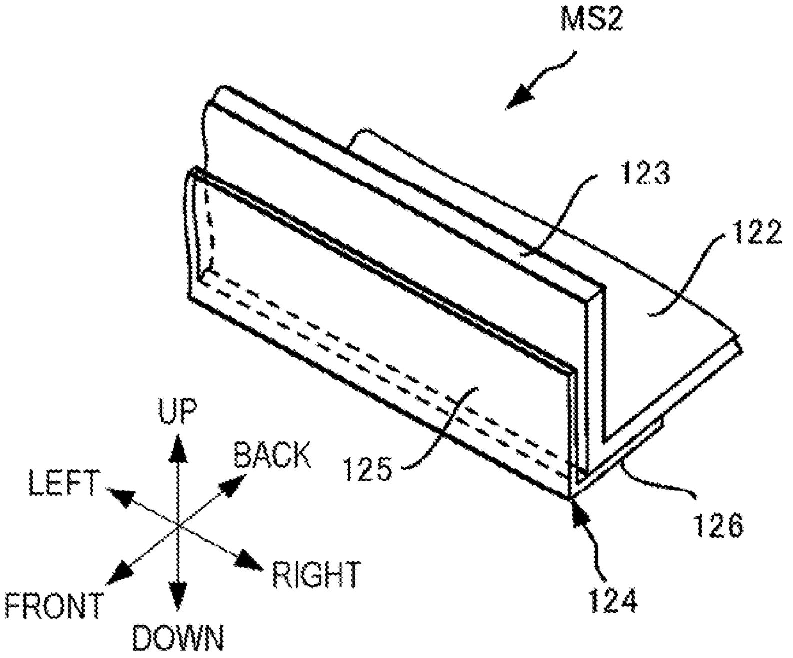
FIG. 10 is a view illustrating one example of a second product shelf to which the shelf tag attachment apparatus is attached according to one example embodiment.

As illustrated in a perspective view in FIG. 10, the second product shelf MS2 is a shelf differing from the first product shelf MS1 described above in a method of attaching the electronic shelf tag 101. The second product shelf MS2 includes a shelf 122 on which a product is generally arranged, a partition plate 123 extending upwards, downwards, leftwards, and rightwards in front of the shelf 122, and an L-shaped plate 124 being arranged in front of the partition plate 123 and below the shelf 122.

The L-shaped plate 124 is a plate-shaped member bent in an L-shape when viewed from the left-right direction. The L-shaped plate 124 includes a front plate 125 disposed substantially parallel to the partition plate 123 in front of the partition plate 123 with a relatively small gap, and a fixed portion 126 being fixed below the shelf 122 by screwing or the like. The clip portion 117 is a portion for sandwiching the front plate 125 being provided by insertion from below.

Specifically, each of the left and right clip portions 117 includes an extension portion 127 extending backwards from the rear surface of the shelf tag attachment portion 113, and a suspended portion 128 suspending downwards from a back end of the extension portion 127. A gap for sandwiching the front plate 125 as described above is formed between the suspended portion 128 and the shelf tag attachment portion 113 by including the extension portion 127, and elastic force for sandwiching and holding the front plate 125 can be applied to the front plate 125 when the front plate 125 is sandwiched.

Moreover, a bearing portion 129 as a first fit portion into which the shaft portion 112 fits is provided in a part in which each of the left and right clip portions 117 is connected to the shelf tag attachment portion 113. The bearing portion 129 according to the present example embodiment forms a cylindrical through-hole extending on left and right sides, and is provided in the extension portion 127, the suspended portion 128, and the shelf tag attachment portion 113.

Lengths, in the up-down direction, of the suspended portions 128 provided in the left and right clip portions 117 differ from each other, and, in the present example embodiment, the left suspended portion 128 is longer than the right suspended portion 128 in the up-down direction. The left suspended portion 128 is provided with a stopper 130 being a pin-shaped portion projecting leftwards from a left end of the left suspended portion 128.

In the present example embodiment, a right end of the right clip portion 117 is configured flush with the right end of the shelf tag attachment portion 113, and a left end of the left clip portion 117 is configured flush with the left end of the shelf tag attachment portion 113. Thus, the stopper 130 projects leftwards from the left end of the left suspended portion 128, and thereby projects in the lateral direction from a side portion (the left end of the shelf tag attachment portion 113) of the shelf tag holding portion 103.

The stopper 130 according to the present example embodiment is provided in only the left suspended portion 128, is not provided in the right suspended portion 128, and a position of the stopper 130 in the up-down direction is lower than a lower end of the right suspended portion 128.

The plug portion 118 is provided on the rear surface of the shelf tag attachment portion 113, and forms a cut, being open on an upper side, for holding a display plate 131. The display plate 131 is a relatively thin sheet-shaped member made of paper, resin, or the like for displaying an advertisement or the like of a product.

The holding plate portion 119 is a flat-plate-shaped portion, in the rear surface of the shelf tag attachment portion 113, projecting backwards below the left and right clip portions 117 and extending in the lateral direction. The holding plate portion 119 is in a flat plate shape in which an upper surface and a lower surface are parallel to each other, and is preferably substantially perpendicular to the rear surface of the shelf tag attachment portion 113. Thereby, removal from a mold becomes easy, and it becomes possible to ease manufacture.

The holding plate connection portion 120 connects a base end of the holding plate portion 119 and the shelf tag attachment portion 113. The holding plate connection portion 120 is thinner than the holding plate portion 119 regarding thickness being a length in the up-down direction, and is provided with a plurality of through-holes H (long holes being long on left and right sides in the present example embodiment) passing through in the up-down direction.

The holding plate portion 119 is connected to the rear surface of the shelf tag attachment portion 113 via such a holding plate connection portion 120, and, thereby, the holding plate portion 119 can be easily separated from the shelf tag attachment portion 113. For example, the holding plate connection portion 120 is easily subjected to brittle fracture by swinging the holding plate portion 119 up and down about the holding plate connection portion 120 several times in a state where the shelf tag attachment portion 113 is held. Thereby, the holding plate portion 119 can be easily separated from the shelf tag attachment portion 113.

Note that, the holding plate connection portion 120 may be configured to be capable of separating the holding plate portion 119 from the shelf tag attachment portion 113, and may be provided with no through-hole when the holding plate connection portion 120 is thinner than the holding plate portion 119. When a through-hole in the up-down direction is provided, the through-hole is not limited to a long hole being long in the left-right direction as in the example embodiment, and may be a relatively small hole in such a shape as a substantially cylindrical shape being shorter in length in the left-right direction than in the example embodiment. When a small through-hole is adopted, a plurality of through-holes may be arranged and provided in the left-right direction with a relatively shorter clearance, and, thereby, the holding plate connection portion 120 may be perforated.

«Attachment and Detachment Method of Electronic Shelf Tag»

So far, the configuration of the shelf tag attachment apparatus 100 has been described. From now on, a method of attaching and detaching the electronic shelf tag 101 to and from the shelf tag holding portion 103 is described.

The electronic shelf tag 101 is pressed against the shelf tag attachment portion 113 from a front side of the shelf tag holding portion 103 in such a way that the back wall portion 108 passes through a gap of the protrusion portion 115.

Specifically, the electronic shelf tag 101 is pressed against the shelf tag attachment portion 113 from the front side of the shelf tag holding portion 103 in such a way that the upper back wall portion 108 passes through a gap of the upper protrusion portion 115, and the lower back wall portion 108 passes through a gap of the lower protrusion portion 115. In this instance, the upper protrusion portion 115 passes through a gap of the upper back wall portion 108, and the lower protrusion portion 115 passes through a gap of the lower back wall portion 108.

Figure 11A:
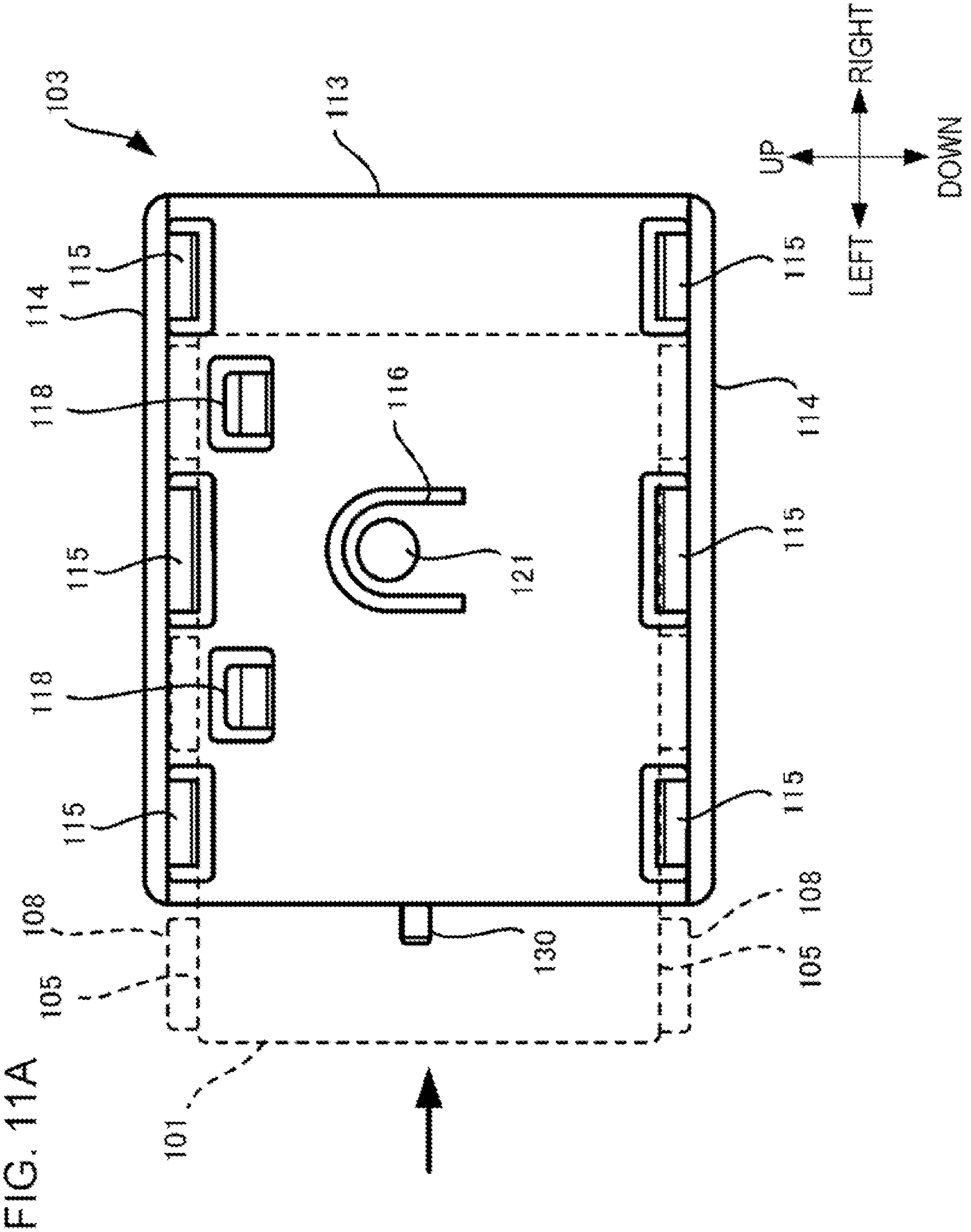
FIG. 11A is a view illustrating a first example of a state where the electronic shelf tag is pressed against a shelf tag attachment portion according to one example embodiment.
Figure 11B:
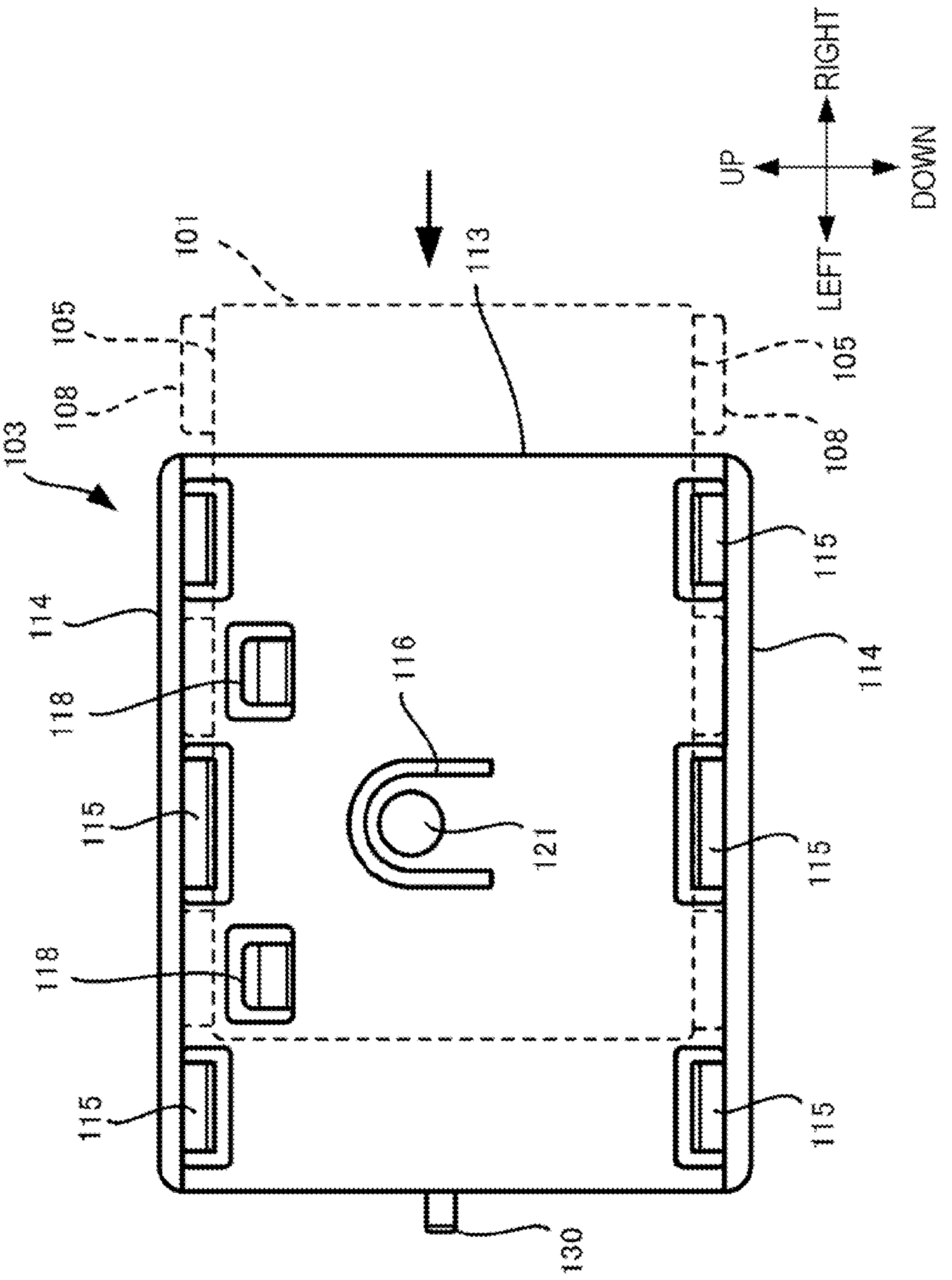
FIG. 11B is a view illustrating a second example of a state where the electronic shelf tag is pressed against the shelf tag attachment portion according to one example embodiment.

Thereby, as illustrated in FIG. 11A or 11B, the protrusion portion 115 and the back wall portion 108 are positioned, the protrusion portion 115 is positioned in the groove portion 105, and the back wall portion 108 is positioned in a groove between the shelf tag attachment portion 113 and the protrusion portion 115. FIGS. 11A and 11B are views viewing, from front, a state where the electronic shelf tag 101 is pressed against the shelf tag attachment portion 113 in order to attach the electronic shelf tag 101 to the shelf tag holding portion 103, and a dotted line indicates the rear surface of the electronic shelf tag 101.

In a state illustrated in FIG. 11A or 11B, the protrusion portion 115 can move in the left-right direction along the groove portion 105, and the back wall portion 108 can move in the left-right direction along the groove between the shelf tag attachment portion 113 and the protrusion portion 115.

From the state illustrated in FIG. 11A, each of the protrusion portions 115 is locked, by, for example, sliding and moving the electronic shelf tag 101 rightwards, in such a way as to be positioned between the back wall portion 108 and the step portion 106, and not allowed to move frontwards and backwards. From the state illustrated in FIG. 11B, each of the protrusion portions 115 is locked, by, for example, sliding and moving the electronic shelf tag 101 leftwards, in such a way as to be positioned between the back wall portion 108 and the step portion 106, and not allowed to move frontwards and backwards.

Thereby, the electronic shelf tag 101 is held to the shelf tag holding portion 103, and attachment of the electronic shelf tag 101 is finished.

When the electronic shelf tag 101 is detached from the shelf tag holding portion 103, a process being opposite to the attachment method described above may be performed.

In other words, the electronic shelf tag 101 is slid and moved leftwards or rightwards in such a way that the upper back wall portion 108 is located behind a gap of the upper protrusion portion 115, and the lower back wall portion 108 is located behind a gap of the lower protrusion portion 115. Then, the electronic shelf tag 101 is moved frontwards relative to the shelf tag attachment portion 113, and, thereby, the electronic shelf tag 101 is detached from the shelf tag holding portion 103.

Thus, in the shelf tag attachment apparatus 100 according to the present example embodiment, both a combination of the upper groove portion 105 and the protrusion portion 115 that fits into the groove portion 105, and a combination of the lower groove portion 105 and the protrusion portion 115 that fits into the groove portion 105 are discretely provided.

Thereby, when the electronic shelf tag 101 is attached to and detached from the shelf tag holding portion 103, there is no longer a need to slide and move a right end of the electronic shelf tag 101 to a left end of the shelf tag holding portion 103, or a left end of the electronic shelf tag 101 to a right end of the shelf tag holding portion 103. With a movement amount less than a movement amount of such slide and movement in the left-right direction, the electronic shelf tag 101 according to the present example embodiment can be attached to and detached from the shelf tag holding portion 103.

Therefore, it becomes possible to attach the electronic shelf tag 101 in a small work space.

Moreover, in the present example embodiment, the flange portion 114 is provided continuously in the lateral direction. Moreover, the upper protrusion portion 115 projects downwards from the upper flange portion 114, and the lower protrusion portion 115 projects upwards from the flange portion 114 projecting frontwards from the lower end of the shelf tag attachment portion 113.

Thereby, it becomes more difficult for dust to enter the groove portion 105 in a state where the electronic shelf tag 101 is attached to the shelf tag holding portion 103, than when the flange portion 114 is discretely provided with a gap. Thus, a possibility that slide and movement of the protrusion portion 115 is blocked due to dust entering the groove portion 105 can be reduced.

Therefore, even when time elapses in a state where the electronic shelf tag 101 is attached to the shelf tag holding portion 103, it becomes possible to easily detach the electronic shelf tag 101 from the shelf tag holding portion 103.

Figure 12:
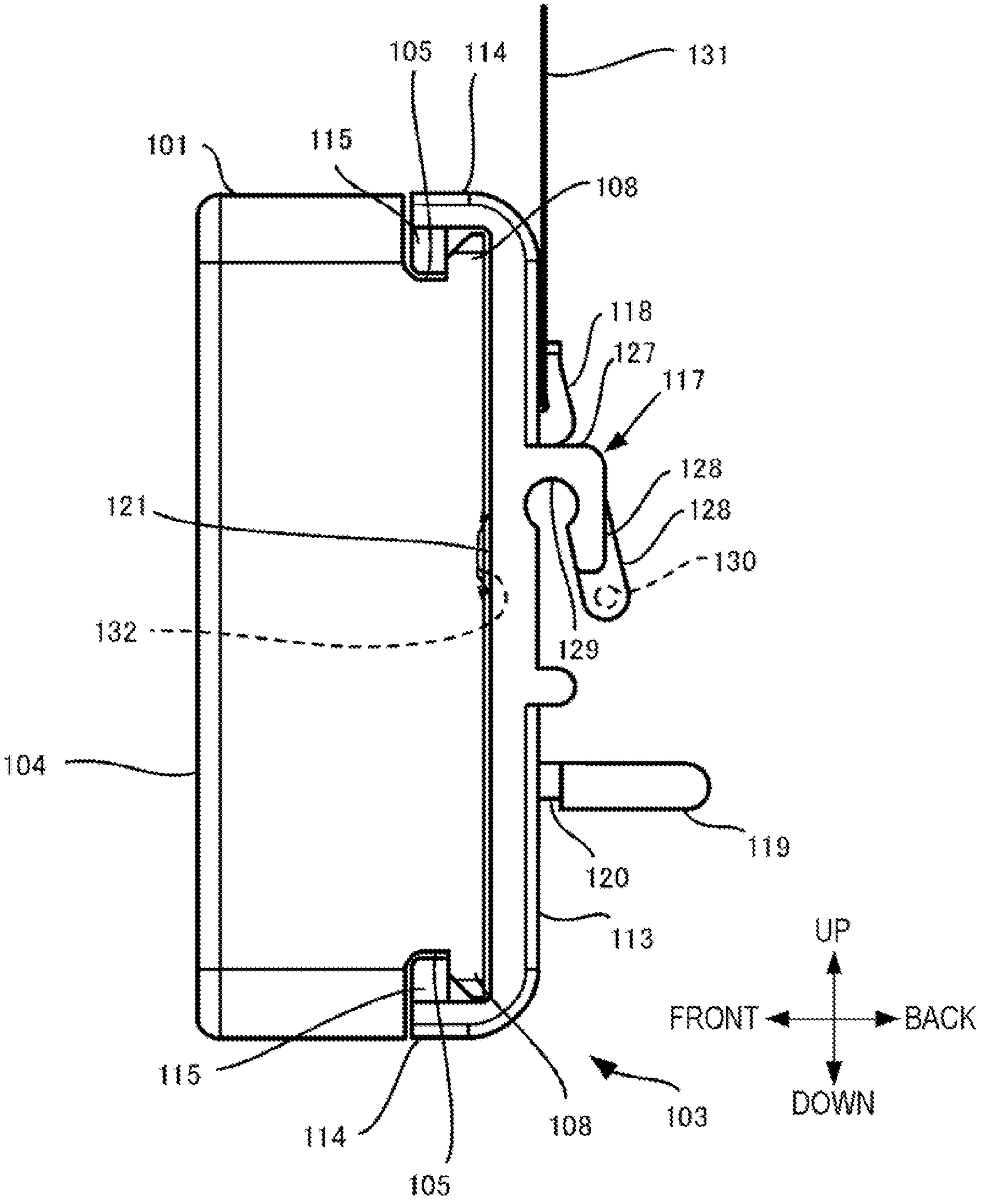
FIG. 12 is a view viewing, from a right side, a state where the electronic shelf tag is held to the shelf tag attachment portion according to one example embodiment.

Further, in the present example embodiment, as illustrated in a side view in FIG. 12, the spring portion 116 (the press protrusion 121) pushes the electronic shelf tag 101 frontwards when the electronic shelf tag 101 is attached to the shelf tag holding portion 103. Thereby, the shelf tag holding portion 103 can firmly hold the attached electronic shelf tag 101. Therefore, it becomes possible to prevent the electronic shelf tag 101 held to the shelf tag holding portion 103 from easily coming off the shelf tag holding portion 103. Note that, the spring portion 116 may push the electronic shelf tag 101 frontwards, and no press protrusion 121 may be provided in the spring portion 116.

Particularly in the present example embodiment, as described above, the electronic shelf tag 101 is detached from the shelf tag holding portion 103 by relatively slight slide and movement. There is a possibility that the electronic shelf tag 101 easily comes off the shelf tag holding portion 103, falls, and is damaged. By inhibiting slide and movement of the electronic shelf tag 101 by the spring portion 116, it becomes possible to reduce such a possibility of damage of the electronic shelf tag 101.

Further, in the present example embodiment, as illustrated in the side view in FIG. 12, a depressed portion 132 forming a depression is provided in the rear surface of the electronic shelf tag 101. The depressed portion 132 is provided at a position to be pushed by the spring portion 116 (the press protrusion 121) when the electronic shelf tag 101 is attached to the shelf tag holding portion 103. Thereby, it becomes possible to further prevent the electronic shelf tag 101 held to the shelf tag holding portion 103 from easily coming off the shelf tag holding portion 103.

Further, in the present example embodiment, the plug portion 118 forming a cut, being open on an upper side, for holding the display plate 131 is provided. Thereby, as illustrated in FIG. 12, the display plate 131 can be attached. By utilizing the display plate 131 and displaying an advertisement or the like of a product, it becomes possible to provide more pieces of information to a customer intending to purchase a product.

«Attachment Method to First Product Shelf MS1 and Operation in Case of Attachment to First Product Shelf MS1»

Each of the left and right shaft portions 112 is positioned in such a way as to be sandwiched between the left and right arm portions 110 from the left-right direction, and inserted from below each of the left and right clip portions 117. Then, the shelf tag holding portion 103 is pressed downwards against the arm portion 110.

Figure 13:
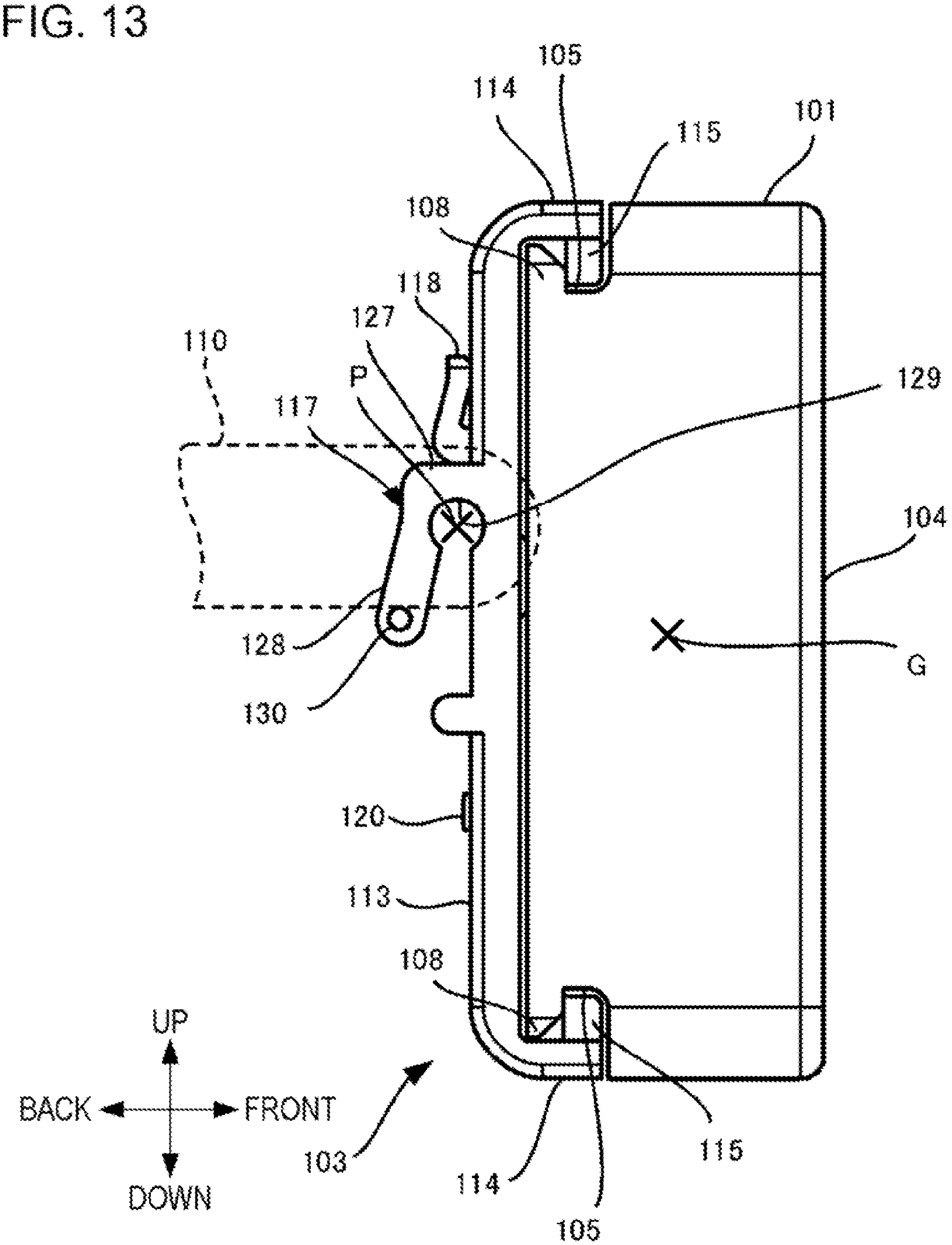
FIG. 13 is a view viewing, from a left side, a state where the shelf tag holding portion holding the electronic shelf tag is attached to an arm portion for attaching to the first product shelf according to one example embodiment.

Thereby, as illustrated in FIG. 13, each of the left and right shaft portions 112 fits into each of the left and right bearing portions 129. Herein, FIG. 13 is a view viewing, from a left side, a state where the shelf tag holding portion 103 holding the electronic shelf tag 101 is attached to the arm portion 110, and the arm portion 110 is illustrated by a dotted line. Note that, in a case of attachment to the first product shelf MS1, the holding plate portion 119 may remain connected to the shelf tag attachment portion 113 via the holding plate connection portion 120, but may be separated as described above, because the holding plate portion 119 is unnecessary. FIG. 13 illustrates a state where the holding plate portion 119 is separated, and FIG. 14 illustrates similarly.

The shelf tag holding portion 103 attached to the arm portion 110 can rotate about rotation axis P passing through centers of the left and right shaft portions 112. Particularly in the present example embodiment, since the tip of the arm portion 110 is in a semi-circular shape, the stopper 130 moves along the tip of the arm portion 110, and thereby the shelf tag holding portion 103 can rotate about the rotation axis P relative to the support member 102, as illustrated by an arc-shaped arrow in FIG. 14.

Figure 14:
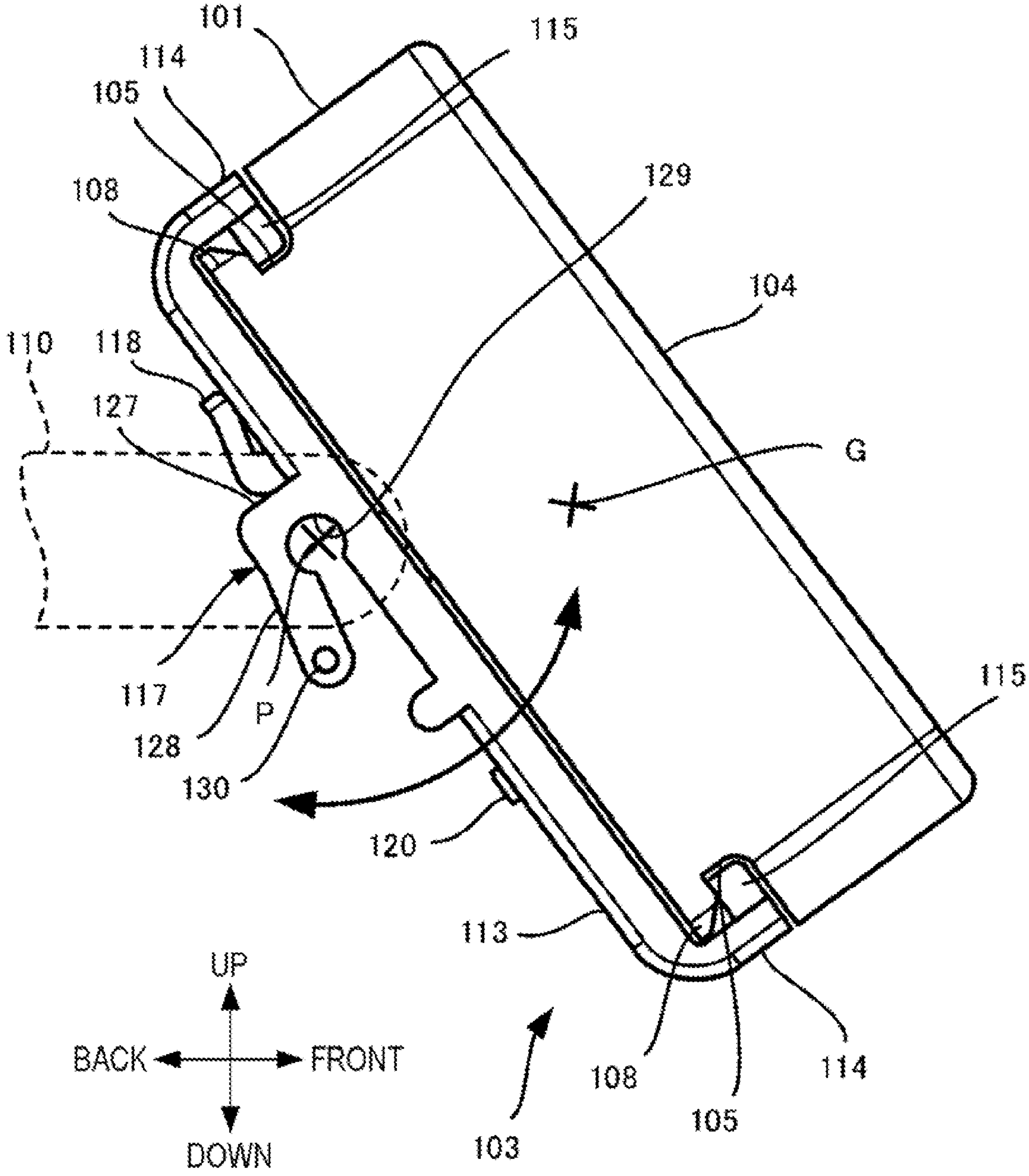
FIG. 14 is a view illustrating one example of a state where the shelf tag holding portion holding the electronic shelf tag is rotated about a rotation axis in such a way that a display portion faces upwards according to one example embodiment.

Herein, FIG. 14 is a view illustrating one example of a state where the shelf tag holding portion 103 holding the electronic shelf tag 101 is rotated about the rotation axis P in such a way that the display portion 104 faces upwards. As illustrated in FIG. 14, the display portion 104 may be easily viewed by a customer who purchases a product, when disposed at a tilt in such a way as to face somewhat upwards. Thus, it is not preferable that the display portion 104 tilts in such a way as to face downwards.

Generally, the display portion 104 may face downwards by touching a hand of a customer or the like who purchases a product.

Moreover, generally, the electronic shelf tag 101 weighs approximately 30 grams, and is heavy as compared with a shelf tag made of paper or resin, and, therefore, there is a concern that the display portion 104 faces downwards by weight thereof in the shelf tag holding portion 103 holding the electronic shelf tag 101.

Particularly, a gravity center of the general electronic shelf tag 101 is mostly positioned substantially in a center or in a vicinity of a center in the up-down direction, and, as illustrated in FIG. 13, the rotation axis P may be provided higher than a gravity center G of the shelf tag holding portion 103 holding the electronic shelf tag 101, when viewed from a left side. In such a case, there is a high possibility that the display portion 104 faces downwards by weight thereof even when the electronic shelf tag 101 is disposed at a tilt in such a way that the display portion 104 faces somewhat upwards as illustrated in FIG. 14.

In the present example embodiment, the stopper 130 projecting leftwards as described above is provided in the left suspended portion 128. Thus, by contacting a lower end of the left arm portion 110 behind the rotation axis P, the shelf tag holding portion 103 is locked in such a way that the display portion 104 does not rotate beyond a previously determined range in a direction to face downwards.

Rotation in a direction in which the display portion 104 faces downwards means rightward rotation about the rotation axis P in FIGS. 13 and 14.

Referring to FIG. 13, in the present example embodiment, the shelf tag holding portion 103 is locked by contact between the stopper 130 and the left arm portion 110 in such a way that the display portion 104 does not further rotate in a direction to face downwards, beyond a direction to face frontwards.

Thus, according to the present example embodiment, only providing the stopper 130 projecting in the lateral direction can suppress the display portion 104 of the electronic shelf tag 101 from rotating beyond a previously determined range in a direction to face downwards. Therefore, by the shelf tag attachment apparatus 100 having a relatively simple structure, it becomes possible to suppress the display portion 104 of the electronic shelf tag 101 from rotating beyond a previously determined range in a direction to face downwards.

Further, in the present example embodiment, a stopper 130 is provided, in the left-right direction, at a position being far from the gravity center of the shelf tag holding portion 103. By being far from gravity center G in the left-right direction, the display portion 104 of the electronic shelf tag 101 can be suppressed, with relatively small force, from rotating beyond a previously determined range in a direction to face downwards. Thus, rotation can be sufficiently suppressed even when the stopper 130 is relatively small.

Therefore, by the shelf tag attachment apparatus 100 having a simple structure, it becomes possible to suppress the display portion 104 of the electronic shelf tag 101 from rotating beyond a previously determined range in a direction to face downwards.

Generally, the gravity center of the electronic shelf tag 101 is mostly positioned substantially in a vicinity of a center in the left-right direction, and, thus, the gravity center G of the shelf tag holding portion 103 holding the electronic shelf tag 101 is also mostly positioned substantially in a vicinity of a center in the left-right direction.

Particularly, the stopper 130 according to the present example embodiment projects leftwards from the left end of the left suspended portion 128. This means that the stopper 130 is provided at a place that mostly becomes a position being farthest, in the left-right direction, from the gravity center G of the shelf tag holding portion 103 holding the electronic shelf tag 101.

Thus, in the present example embodiment, the display portion 104 of the electronic shelf tag 101 can be suppressed, with relatively small force, from rotating beyond a previously determined range in a direction to face downwards, and rotation can be sufficiently suppressed even when the stopper 130 is relatively small.

Therefore, by the shelf tag attachment apparatus 100 having a simpler structure, it becomes possible to suppress the display portion 104 of the electronic shelf tag 101 from rotating beyond a previously determined range in a direction to face downwards.

«Attachment Method to Second Product Shelf MS2»

Figure 15A:
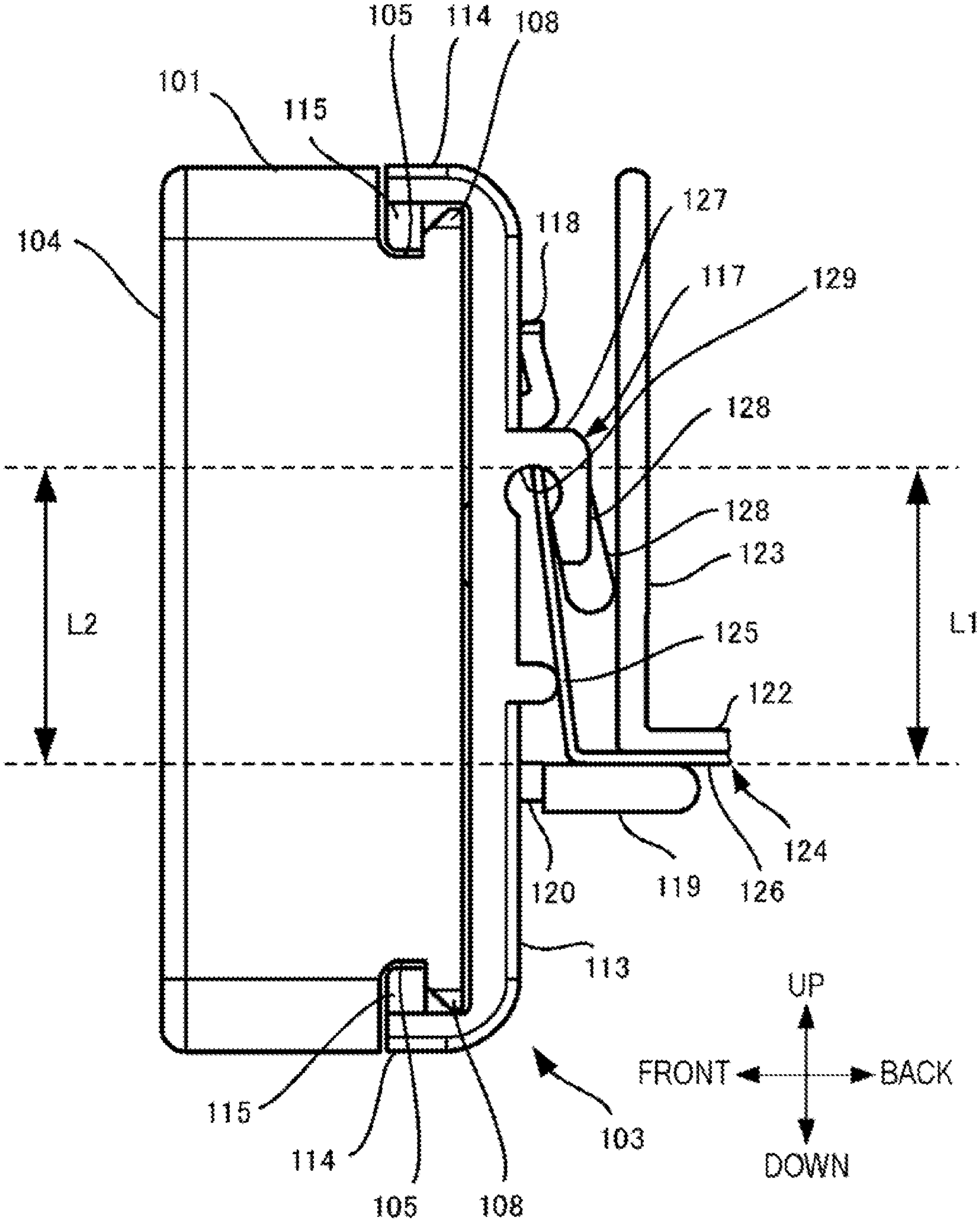
FIG. 15A is a view viewing, from a right side, a first example of a state where the shelf tag holding portion holding the electronic shelf tag is attached to the second product shelf according to one example embodiment.
Figure 15B:
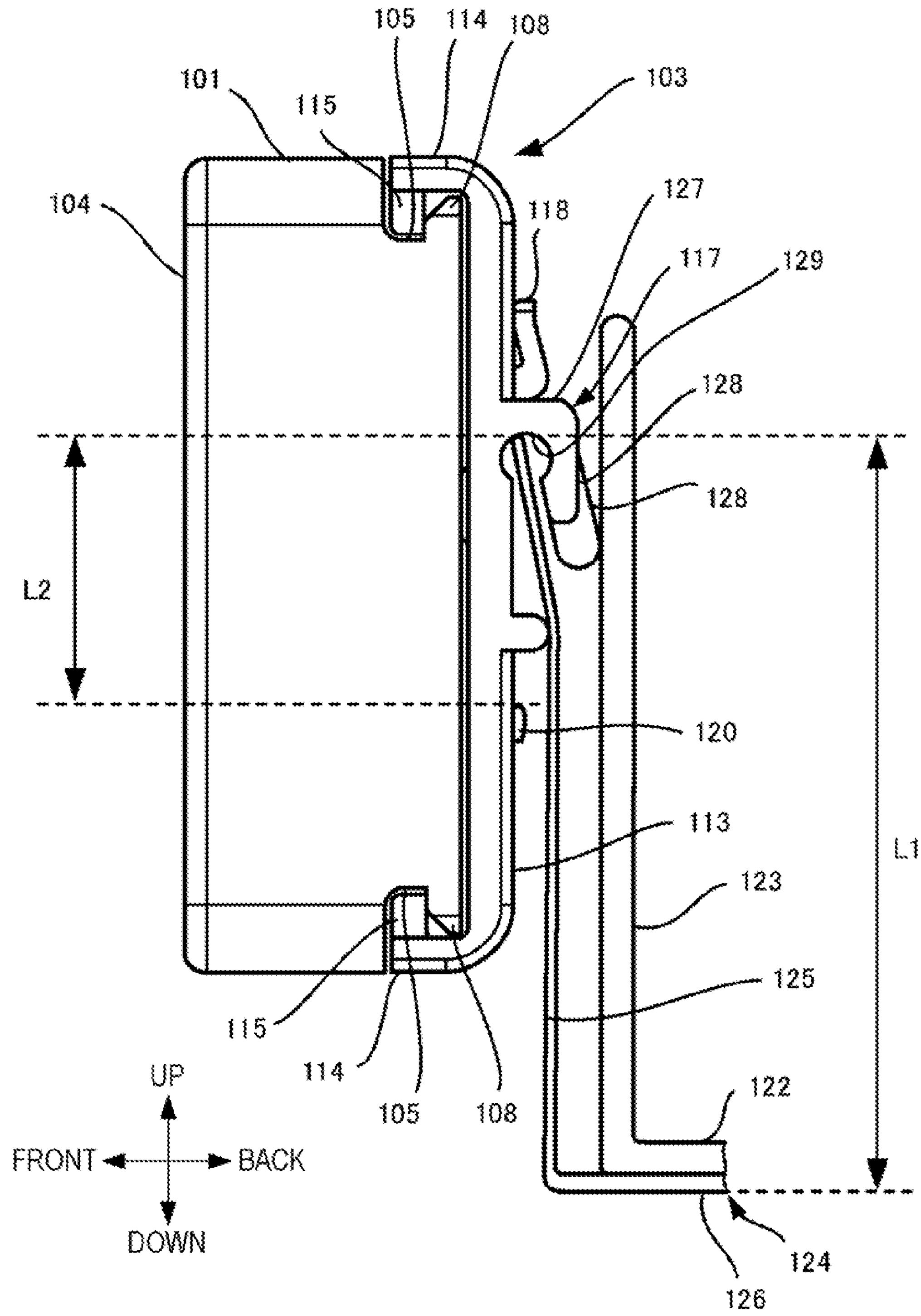
FIG. 15B is a view viewing, from a right side, a second example of a state where the shelf tag holding portion holding the electronic shelf tag is attached to the second product shelf according to one example embodiment.

When the shelf tag holding portion 103 holding the electronic shelf tag 101 is attached to the second product shelf MS2, there are two attachment methods depending on a relation between a length L1 and a length L2, as illustrated in FIGS. 15A and 15B. The length L1 is a length between an upper end of the front plate 125 and a lower surface of the shelf 122 in the up-down direction. The length L2 is a length between an upper surface of the holding plate portion 119 and the bearing portion 129 in the up-down direction.

A first attachment method to the second product shelf MS2 is a method of attaching the shelf tag holding portion 103 to the second product shelf MS2 when the length L1 is equal to or less than the length L2. As one example of this case, FIG. 15A illustrates an example in which the length L1 and the length L2 are substantially equal. In this case, the front plate 125 provided on the second product shelf MS2 is inserted from below between the clip portion 117 and the rear surface of the shelf tag attachment portion 113. Then, the holding plate portion 119 is disposed under the shelf 122.

As illustrated in a right side view in FIG. 15A, the front plate 125 provided on the second product shelf MS2 is sandwiched between the clip portion 117 and the rear surface of the shelf tag attachment portion 113, and also held by the holding plate portion 119. Thereby, the shelf tag holding portion 103 holding the electronic shelf tag 101 is attached to the second product shelf MS2. In a case of detachment, a process being opposite to a process described herein may be performed.

In this case, the electronic shelf tag 101 attached to the second product shelf MS2 via the shelf tag holding portion 103 not only sandwiches the front plate 125, but is also held by the holding plate portion 119, as described above. In other words, even when force by which the display portion 104 swings in such a way as to face upwards or downwards or force by which the display portion 104 moves upwards is applied, a range of the swing or movement is limited by contact of the holding plate portion 119 with a lower surface of the second product shelf MS2 (in the example in FIG. 15A, the fixed portion 126).

Thus, even when force is applied to the electronic shelf tag 101 by, for example, touching or the like of a hand of a purchaser of a product on the second product shelf MS2, it becomes difficult for the electronic shelf tag 101 to come off the second product shelf MS2. Therefore, it becomes possible to reduce a possibility that the electronic shelf tag 101 falls and is damaged.

A second attachment method to the second product shelf MS2 is a method of attaching the shelf tag holding portion 103 to the second product shelf MS2 when the length L1 is longer than the length L2, and FIG. 15B illustrates one example of this case. In this case, the holding plate portion 119 is separated. Then, the front plate 125 provided on the second product shelf MS2 is inserted from below between the clip portion 117 and the rear surface of the shelf tag attachment portion 113.

As illustrated in a right side view in FIG. 15B, the front plate 125 provided on the second product shelf MS2 is sandwiched between the clip portion 117 and the rear surface of the shelf tag attachment portion 113, and, thereby, the front plate 125 is warped by elasticity thereof. Thus, a front surface and a back surface of the front plate 125 contact each of the rear surface of the shelf tag attachment portion 113 and the clip portion 117 in a state where elastic force of the front plate 125 is applied. Thereby, the shelf tag holding portion 103 holding the electronic shelf tag 101 is attached to the second product shelf MS2. In a case of detachment, the clip portion 117 may be pulled out from between the clip portion 117 and the rear surface of the shelf tag attachment portion 113, by, for example, holding the electronic shelf tag 101 and moving the electronic shelf tag 101 upwards.

The shelf tag attachment apparatus 100 according to the present example embodiment can attach the electronic shelf tag 101 to the first product shelf MS1 and the second product shelf MS2 differing in an attachment method. Moreover, since the holding plate portion 119 can be easily separated from the shelf tag attachment portion 113 as described above, the electronic shelf tag 101 can be attached to a variety of the second product shelves MS2.

While one example embodiment of the present invention has been described so far, the present invention is not limited thereto, and may be modified as follows.

For example, in the example embodiment, an example has been described in which the shelf tag holding portion 103 includes the bearing portion 129 as a first fit portion being one of a shaft portion and a bearing portion for rotating about the rotation axis P relative to the support member 102. Moreover, an example has been described in which the support member 102 includes the shaft portion 112 as a second fit portion being another of the shaft portion and the bearing portion for rotating about the rotation axis P relative to the support member 102.

However, the shelf tag holding portion 103 may include a shaft portion as a first fit portion, and the support member 102 may include a bearing portion as a second fit portion. This also provides an advantageous effect similar to that in the example embodiment.

Figure 16:
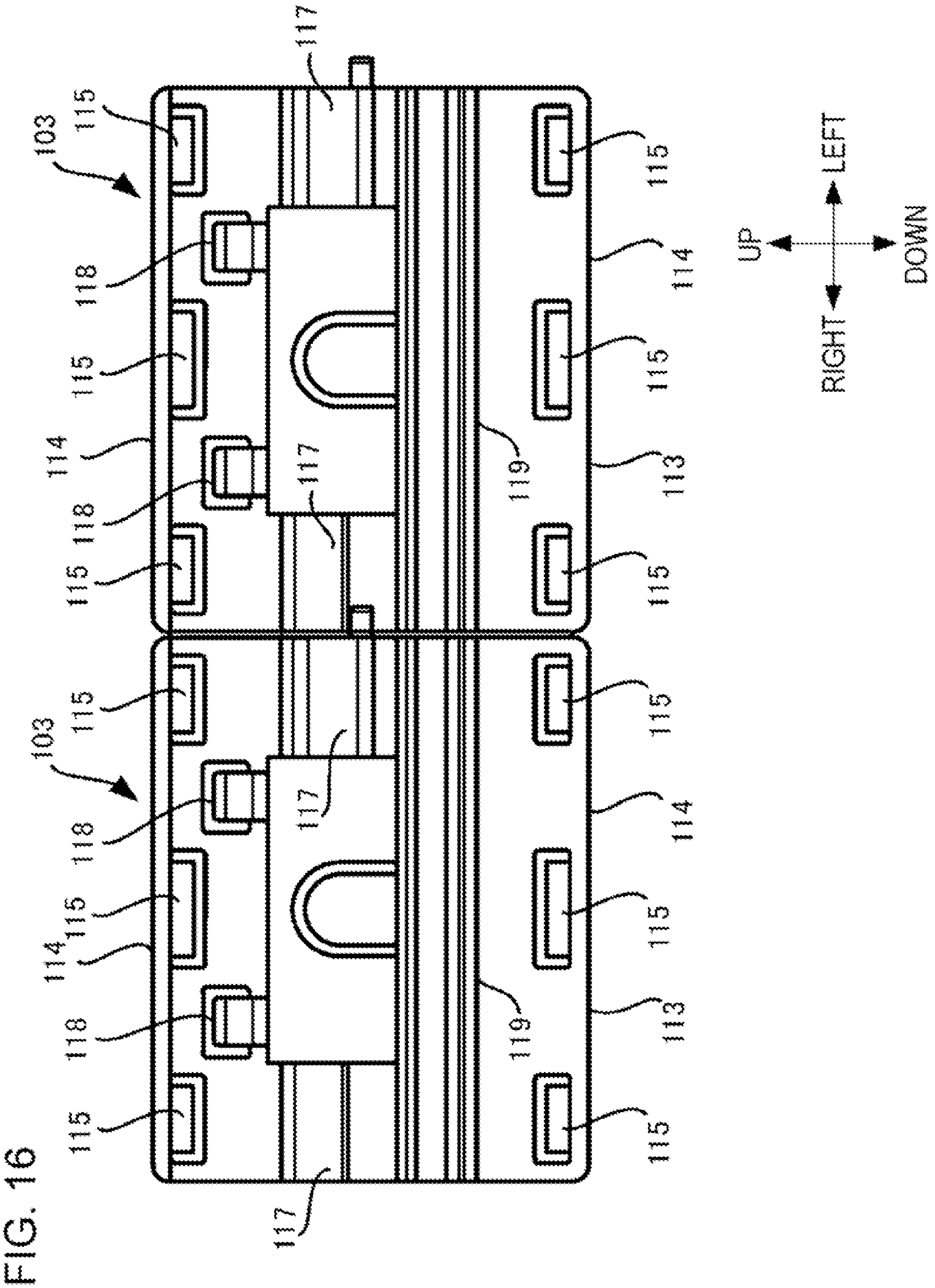
FIG. 16 is a rear view illustrating an example in which the shelf tag holding portion is disposed with such a clearance as to substantially contact in a left-right direction according to one example embodiment.

For example, an example has been described in which the right suspended portion 128 is shorter than the left suspended portion 128, and the stopper 130 is provided in only the long left suspended portion 128, and is disposed below the lower end of the right suspended portion 128. Thereby, as illustrated in FIG. 16, it becomes possible to dispose the shelf tag holding portion 103 with such a small clearance as to substantially contact in the left-right direction.

However, the right suspended portion 128 may be provided with the same length as the left suspended portion 128, and the stoppers 130 may be provided in both the left and right suspended portions 128.

Moreover, for example, in the example embodiment, an example has been described in which the stopper 130 projects leftwards from the left end of the left suspended portion 128, and thereby projects from the side portion of the shelf tag holding portion 103. However, the stopper 130 may not project from the side portion of the shelf tag holding portion 103.

For example, outer dimensions of the left and right arm portions 110 in the left-right direction may be contained inside the left and right clip portions 117, and the shaft portion 112 of the arm portion 110 may extend outwards, in contrast to the example embodiment.

In other words, the shaft portion 112 extending leftwards from a left end face of the left arm portion 110, and the shaft portion 112 extending rightwards from a right end face of the right arm portion 110 may be provided. In this case, the shaft portion 112 provided in the left arm portion 110 may be provided by insertion in the left bearing portion 129 from a right side, and the shaft portion 112 provided in the right arm portion 110 may be provided by insertion in the right bearing portion 129 from a left side.

In this instance, since the left arm portion 110 is positioned on a right side of the left suspended portion 128, the stopper 130 may extend rightwards from a right end of the left suspended portion 128, i.e., extend towards a center of the shelf tag attachment portion 113 in the left-right direction. A position of the stopper 130 in the front-back direction and the up-down direction may be the same as that in the example embodiment.

Thereby, similarly to the example embodiment, the shelf tag holding portion 103 can lock by contact between the stopper 130 and the left arm portion 110 in such a way that the display portion 104 does not further rotate in a direction to face downwards, beyond a direction to face frontwards.

Therefore, by the shelf tag attachment apparatus 100 having a relatively simple structure, it becomes possible to suppress the display portion 104 of the electronic shelf tag 101 from rotating beyond a previously determined range in a direction to face downwards.

Modified Example 1

In the example embodiment, an example has been described in which positions of gaps in a lateral direction are the same in a combination of an upper groove portion 105 and a protrusion portion 115 that fits into the groove portion 105, and a combination of the lower groove portion 105 and the protrusion portion 115 that fits into the groove portion 105.

However, positions of gaps in the lateral direction may differ from each other on upper and lower sides in a combination of the upper groove portion 105 and the protrusion portion 115 that fits into the groove portion 105, and a combination of the lower groove portion 105 and the protrusion portion 115 that fits into the groove portion 105.

Figure 17:
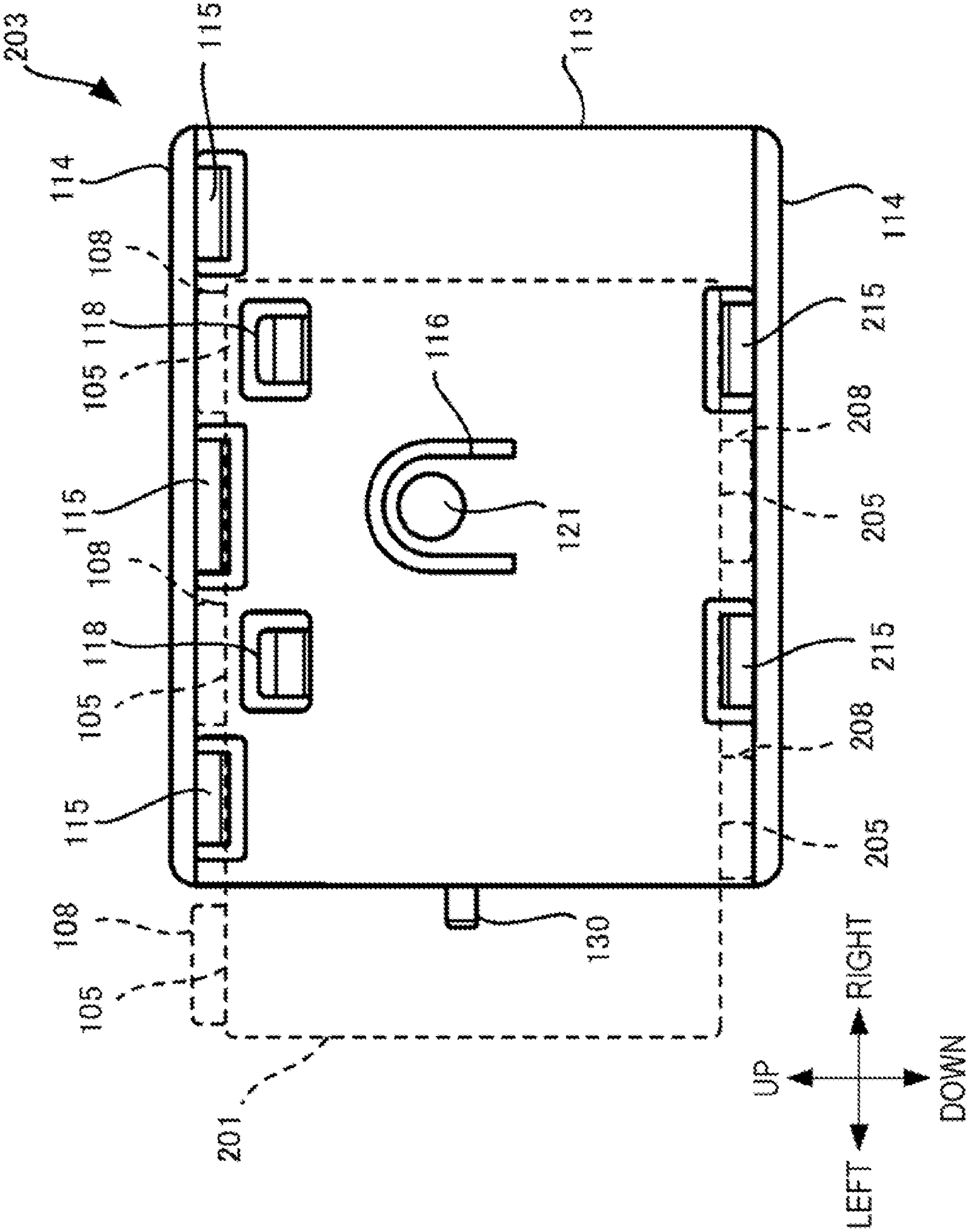
FIG. 17 is a front view of a shelf tag holding portion according to a modified example 1.

FIG. 17 illustrates an example of a shelf tag holding portion 203 according to the present modified example. In the shelf tag holding portion 203, a combination of the upper groove portion 105 and the protrusion portion 115 that fits into the groove portion 105 is the same as that in the example embodiment. In contrast, a position where a combination of a lower groove portion 205 and a protrusion portion 215 that fits into the groove portion 205 is provided differs from that in the example embodiment.

The lower groove portion 205 (a back wall portion 208) is provided below a gap of the upper groove portion 105 (a back wall portion 108). Moreover, the lower protrusion portion 215 is provided below a gap of the upper protrusion portion 115.

The present figure illustrates, with a dotted line, one example of a position where a rear surface of an electronic shelf tag 201 is disposed when the electronic shelf tag 201 is pressed against a shelf tag attachment portion 113 in order to attach the electronic shelf tag 201 to the shelf tag holding portion 203.

As understood from the present figure, according to the present modified example as well, similarly to the example embodiment, the protrusion portions 115 and 215 can move along the groove portion 105 in a left-right direction, and the back wall portion 108 can move along a groove between the shelf tag attachment portion 113 and the protrusion portions 115 and 215 in the left-right direction.

Therefore, an advantageous effect similar to that in the example embodiment is provided.

Moreover, according to the present modified example, the electronic shelf tag 201 is not allowed to be turned upside down and attached to the shelf tag holding portion 203. Thus, the electronic shelf tag 201 can be prevented from being erroneously inverted in an up-down direction and attached to the shelf tag holding portion 203.

Modified Example 2

In the example embodiment, an example has been described in which both combinations of a combination of an upper groove portion 105 and a protrusion portion 115 that fits into the groove portion 105, and a combination of the lower groove portion 105 and the protrusion portion 115 that fits into the groove portion 105 are discretely provided.

However, only one combination of a combination of the upper groove portion 105 and a protrusion portion 115 that fits into the groove portion 105, and a combination of the lower groove portion 105 and the protrusion portion 115 that fits into the groove portion 105 may be discretely provided.

Figure 18:
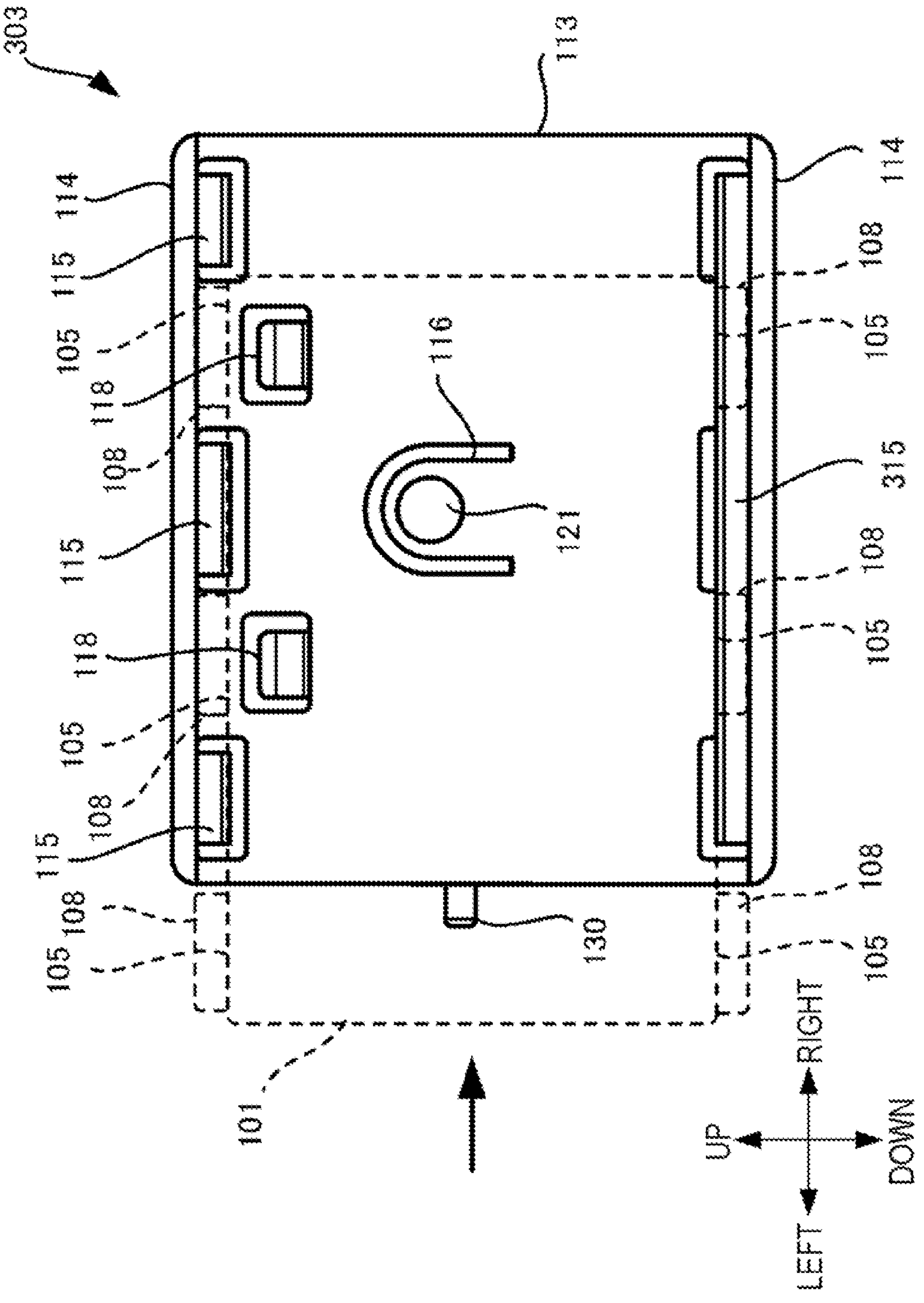
FIG. 18 is a front view of a shelf tag holding portion according to a modified example 2.

FIG. 18 is a front view of a shelf tag holding portion 303 according to the present modified example. In the shelf tag holding portion 303, a protrusion portion 315 that fits into the lower groove portion 105 is continuously provided. The present figure illustrates, with a dotted line, one example of a position where a rear surface of an electronic shelf tag 101 is disposed when the electronic shelf tag 101 is pressed against a shelf tag attachment portion 113 in order to attach the electronic shelf tag 101 to the shelf tag holding portion 303.

In the present modified example, the electronic shelf tag 101 may be somewhat tilted, the lower protrusion portion 315 may be fitted into the lower groove portion 105, and then the electronic shelf tag 101 may be pressed against the shelf tag attachment portion 113 from a front side of a shelf tag holding portion 103 in such a way that an upper back wall portion 108 passes through a gap of the upper protrusion portion 115.

Thus, similarly to the example embodiment, the protrusion portions 115 and 315 can be moved along the groove portion 105 in a left-right direction, and the back wall portion 108 can be moved along a groove between the shelf tag attachment portion 113 and the protrusion portions 115 and 315 in the left-right direction.

According to the present modified example as well, an advantageous effect similar to that in the example embodiment is provided.

One means or all means according to the example embodiment described above can also be described as, but are not limited to, the following supplementary notes.

1. A shelf tag attachment apparatus including:
 a shelf tag; and
 a shelf tag holding portion for holding the shelf tag, wherein
 the shelf tag includes, on each of an upper end and a lower end, a groove portion extending in a lateral direction,
 the shelf tag holding portion includes a protrusion portion that projects downwards and upwards, and that fits into each of the upper groove portion and the lower groove portion, and
 at least one combination of a combination of the upper groove portion and a protrusion portion that fits into the groove portion, and a combination of the lower groove portion and a protrusion portion that fits into the groove portion is discretely provided.

2. The shelf tag attachment apparatus according to supplementary note 1 described above, wherein
 both combinations of a combination of the upper groove portion and a protrusion portion that fits into the groove portion, and a combination of the lower groove portion and a protrusion portion that fits into the groove portion are discretely provided.

3. The shelf tag attachment apparatus according to supplementary note 2 described above, wherein
 positions of gaps in the lateral direction vertically differ from each other between a combination of the upper groove portion and a protrusion portion that fits into the groove portion, and a combination of the lower groove portion and a protrusion portion that fits into the groove portion.

4. The shelf tag attachment apparatus according to any one of supplementary notes 1 to 3 described above, wherein
 the shelf tag holding portion includes
 a shelf tag attachment portion to which the shelf tag is attached, and
 a flange portion projecting frontwards from each of an upper end and a lower end of the shelf tag attachment portion, and continuing in the lateral direction, and
 the protrusion portion projects downwards from a flange portion projecting frontwards from an upper end of the shelf tag attachment portion, and projects upwards from a flange portion projecting frontwards from a lower end of the shelf tag attachment portion.

5. The shelf tag attachment apparatus according to any one of supplementary notes 1 to 4 described above, wherein
 the shelf tag holding portion includes a spring portion that pushes the shelf tag frontwards when the shelf tag is attached.

6. The shelf tag attachment apparatus according to supplementary note 5 described above, wherein
 the shelf tag includes a depressed portion forming a depression at a position to be pushed by the spring portion when being attached to the shelf tag holding portion.

7. The shelf tag attachment apparatus according to supplementary note 6 described above, wherein
 the spring portion includes a press protrusion projecting towards the shelf tag, and
 the depressed portion forms the depression at a position to be pushed by the press protrusion.

This application is based upon and claims the benefit of priority from Japanese patent application No. 2020-130342, filed on Jul. 31, 2020, the disclosure of which is incorporated herein in its entirety by reference.

REFERENCE SIGNS LIST

100 Shelf tag attachment apparatus
101, 201 Electronic shelf tag
102 Support member
103, 203, 303 Shelf tag holding portion
104 Display portion
105, 205 Groove portion
106 Step portion
107 Upper surface portion
108, 208 Back wall portion
109 Rod-shaped body
110 Arm portion
111 Coupling and fixing portion
112 Shaft portion
113 Shelf tag attachment portion
114 Flange portion
115, 215, 315 Protrusion portion
116 Spring portion
117 Clip portion
118 Plug portion
119 Holding plate portion
120 Holding plate connection portion
121 Press protrusion
122 Shelf
123 Partition plate
124 L-shaped plate
125 Front plate
126 Fixed portion
127 Extension portion
128 Suspended portion
129 Bearing portion
130 Stopper
131 Display plate
132 Depressed portion

What is claimed is:

1. A shelf tag attachment apparatus comprising:
 a shelf tag; and
 a shelf tag holding portion for holding the shelf tag, wherein
 the shelf tag includes upper groove portions extending in a lateral direction on an upper end and lower groove portions extending in the lateral direction on a lower end,
 the shelf tag holding portion includes upper protrusion portions that project downwards and lower protrusion portions that project upwards, and the upper protrusion portions are configured to fit into the upper groove portions and the lower protrusion portions are configured to fit into the lower groove portions,
 at least one combination of upper combinations of the upper groove portions and the upper protrusion portions that fit into the upper groove portions, and lower combinations of the lower groove portions and the lower protrusion portions that fits into the lower groove portions is discretely provided in the lateral direction, both combinations of the upper combinations and the lower combinations are discretely provided in the lateral direction, and positions of gaps in the lateral direction vertically differ from each other between the upper combinations and the lower combinations.

2. The shelf tag attachment apparatus according to claim 1, wherein the shelf tag holding portion includes a shelf tag attachment portion to which the shelf tag is attached, and an upper flange portion projecting frontwards from an upper end of the shelf tag attachment portion, and continuing in the lateral direction, and a lower flange portion projecting frontwards from a lower end of the shelf tag attachment portion, and the upper protrusion portions project downwards from the upper flange portion and the lower protrusion portions project upwards from the lower flange portion.

3. A shelf tag attachment apparatus comprising:

a shelf tag; and a shelf tag holding portion for holding the shelf tag, wherein the shelf tag includes upper groove portions extending in a lateral direction on an upper end and lower groove portions extending in the lateral direction on a lower end, the shelf tag holding portion includes upper protrusion portions that project downwards and lower protrusion portions that project upwards, and the upper protrusion portions are configured to fit into the upper groove portions and the lower protrusion portions are configured to fit into the lower groove portions, at least one combination of upper combinations of the upper groove portions and the upper protrusion portions that fit into the upper groove portions, and lower combinations of the lower groove portions and the lower protrusion portions that fits into the lower groove portions is discretely provided in the lateral direction, and the shelf tag holding portion includes a spring portion that pushes the shelf tag frontwards when the shelf tag is attached, and the shelf tag includes a depressed portion forming a depression at a position to be pushed by the spring portion when being attached to the shelf tag holding portion.

4. The shelf tag attachment apparatus according to claim 3, wherein the spring portion includes a press protrusion projecting towards the shelf tag, and the depressed portion forms the depression at a position to be pushed by the press protrusion.

5. The shelf tag attachment apparatus according to claim 3, wherein the shelf tag holding portion includes a shelf tag attachment portion to which the shelf tag is attached, and an upper flange portion projecting frontwards from an upper end of the shelf tag attachment portion, and continuing in the lateral direction, and a lower flange portion projecting frontwards from a lower end of the shelf tag attachment portion, and the upper protrusion portions project downwards from the upper flange portion and the lower protrusion portions project upwards from the lower flange portion.

* * * * *